US010290135B2

(12) United States Patent
Mizoguchi et al.

(10) Patent No.: US 10,290,135 B2
(45) Date of Patent: May 14, 2019

(54) IMAGE PROCESSING APPARATUS, IMAGE PROCESSING METHOD, AND STORAGE MEDIUM STORING A PROGRAM THAT SELECT IMAGES BASED ON EVALUATIONS AND LAY OUT A MAIN IMAGE ON A MAIN SLOT AND A SUB IMAGE ON A SUB SLOT IN A TEMPLATE

(71) Applicant: CANON KABUSHIKI KAISHA, Tokyo (JP)

(72) Inventors: Yoshinori Mizoguchi, Tokyo (JP); Masao Kato, Kawasaki (JP); Fumitaka Goto, Tokyo (JP); Hiroyasu Kunieda, Yokohama (JP); Masaaki Obayashi, Kawasaki (JP); Maya Kurokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 15/219,369

(22) Filed: Jul. 26, 2016

(65) Prior Publication Data
US 2017/0039746 A1    Feb. 9, 2017

(30) Foreign Application Priority Data

Aug. 7, 2015  (JP) .................................. 2015-157513
Dec. 25, 2015  (JP) .................................. 2015-255240

(51) Int. Cl.
G06K 9/00        (2006.01)
G06K 9/52        (2006.01)
(Continued)

(52) U.S. Cl.
CPC .......... G06T 11/60 (2013.01); G06K 9/00268 (2013.01); G06K 9/52 (2013.01);
(Continued)

(58) Field of Classification Search
CPC .......... G06T 11/60; G06T 2207/30201; G06K 9/00268; G06K 9/6215; G06K 9/52; G06K 9/6267
See application file for complete search history.

(56) References Cited

U.S. PATENT DOCUMENTS 5,095,328 A    3/1992 Mizoguchi
6,546,131 B1   4/2003 Mizoguchi et al.
(Continued)

FOREIGN PATENT DOCUMENTS

JP    2006-293986 A    10/2006
JP    2008-084047 A    4/2008
(Continued)

OTHER PUBLICATIONS

Communication including Extended European Search Report dated Jan. 2, 2017, issued in corresponding European Patent Application No. 16001638.2-1901.

Primary Examiner — Chan S Park
Assistant Examiner — Elisa M Rice
(74) Attorney, Agent, or Firm — Venable LLP

(57) ABSTRACT

An image processing method in which a feature amount is analyzed for each of a plurality of images as layout target candidates. First and second image evaluations are performed for an image of the plurality of images, in accordance with first and second (different) evaluation criteria. A main image to be laid out on a main slot in a template is selected from the plurality of images based on the first image evaluation for each of the plurality of images. A sub image is selected to be laid out on a sub slot in the template, which is smaller than the main slot, based on the second image evaluation for each of the plurality of images. The main image is laid out on the main slot in the template, and the sub image is laid out on the sub slot in the template.

21 Claims, 17 Drawing Sheets

(51) Int. Cl.
*G06K 9/62* (2006.01)
*G06T 11/60* (2006.01)

(52) U.S. Cl.
CPC ......... *G06K 9/6215* (2013.01); *G06K 9/6267* (2013.01); *G06T 2207/30201* (2013.01)

(56) References Cited

U.S. PATENT DOCUMENTS

| | | | |
|---|---|---|---|
| 6,671,405 B1 * | 12/2003 | Savakis | G06K 9/00234 |
| | | | 358/527 |
| 7,035,467 B2 * | 4/2006 | Nicponski | G06K 9/6269 |
| | | | 382/190 |
| 8,090,158 B2 | 1/2012 | Nonaka et al. | |
| 8,098,896 B2 | 1/2012 | Isomura et al. | |
| 8,981,558 B2 | 3/2015 | Ide | |
| 9,189,681 B2 | 11/2015 | Kunieda et al. | |
| 9,214,027 B2 | 12/2015 | Sumi et al. | |
| 9,275,270 B2 | 3/2016 | Suwa et al. | |
| 9,639,753 B2 | 5/2017 | Yamaji et al. | |
| 2006/0080719 A1 * | 4/2006 | Minatogawa | H04N 1/00127 |
| | | | 725/105 |
| 2008/0049976 A1 * | 2/2008 | Isomura | G06F 17/3028 |
| | | | 382/106 |
| 2008/0205789 A1 * | 8/2008 | Ten Kate | G06T 11/60 |
| | | | 382/284 |
| 2014/0013213 A1 | 1/2014 | Kajiwara et al. | |
| 2014/0016147 A1 * | 1/2014 | Hobbs | G06T 11/60 |
| | | | 358/1.9 |
| 2016/0062716 A1 | 3/2016 | Sasaki et al. | |

FOREIGN PATENT DOCUMENTS

| | | |
|---|---|---|
| JP | 2008-529150 A | 7/2008 |
| JP | 2011-186715 A | 9/2011 |
| JP | 2015-065497 A | 4/2015 |

\* cited by examiner

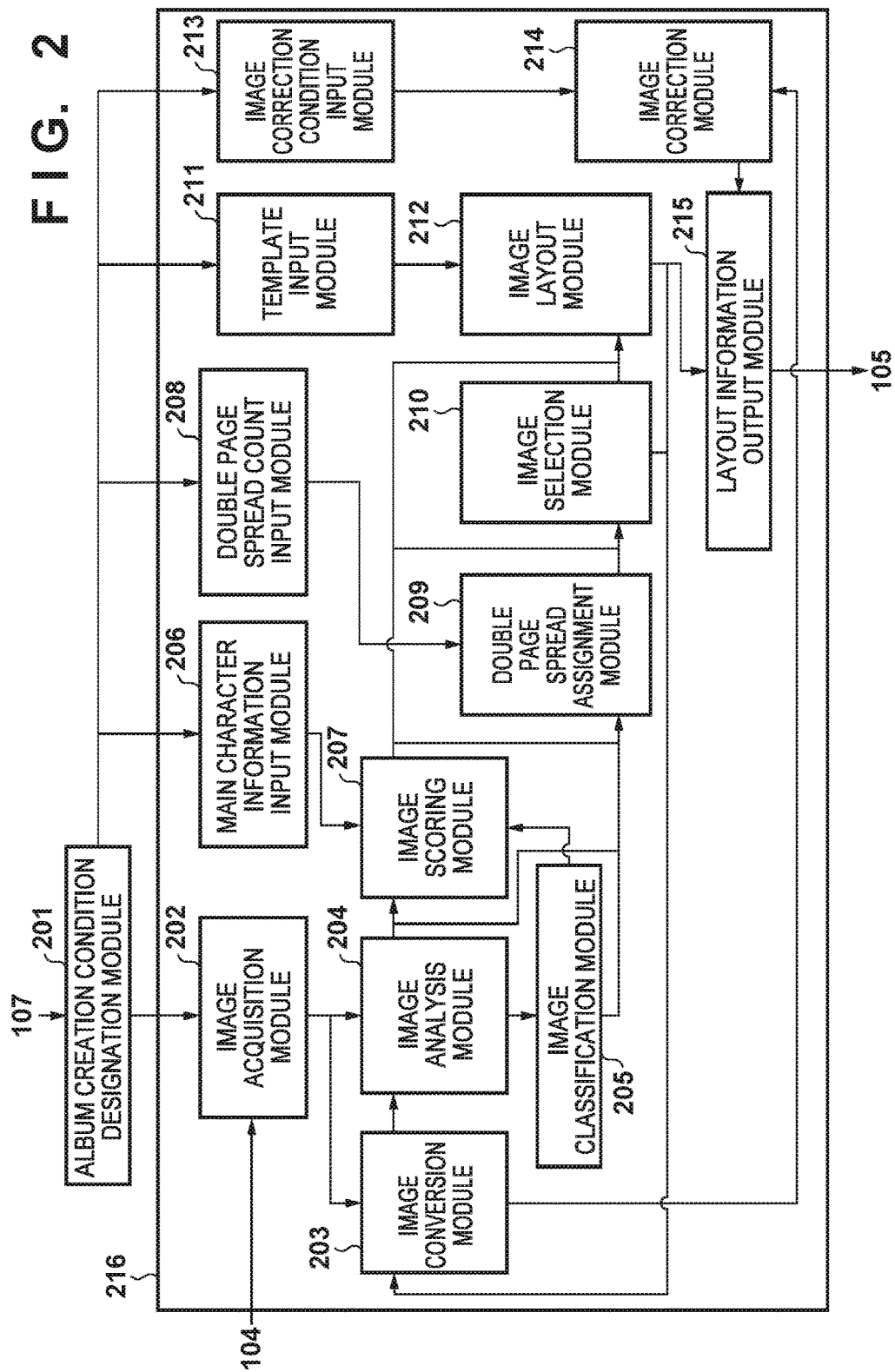

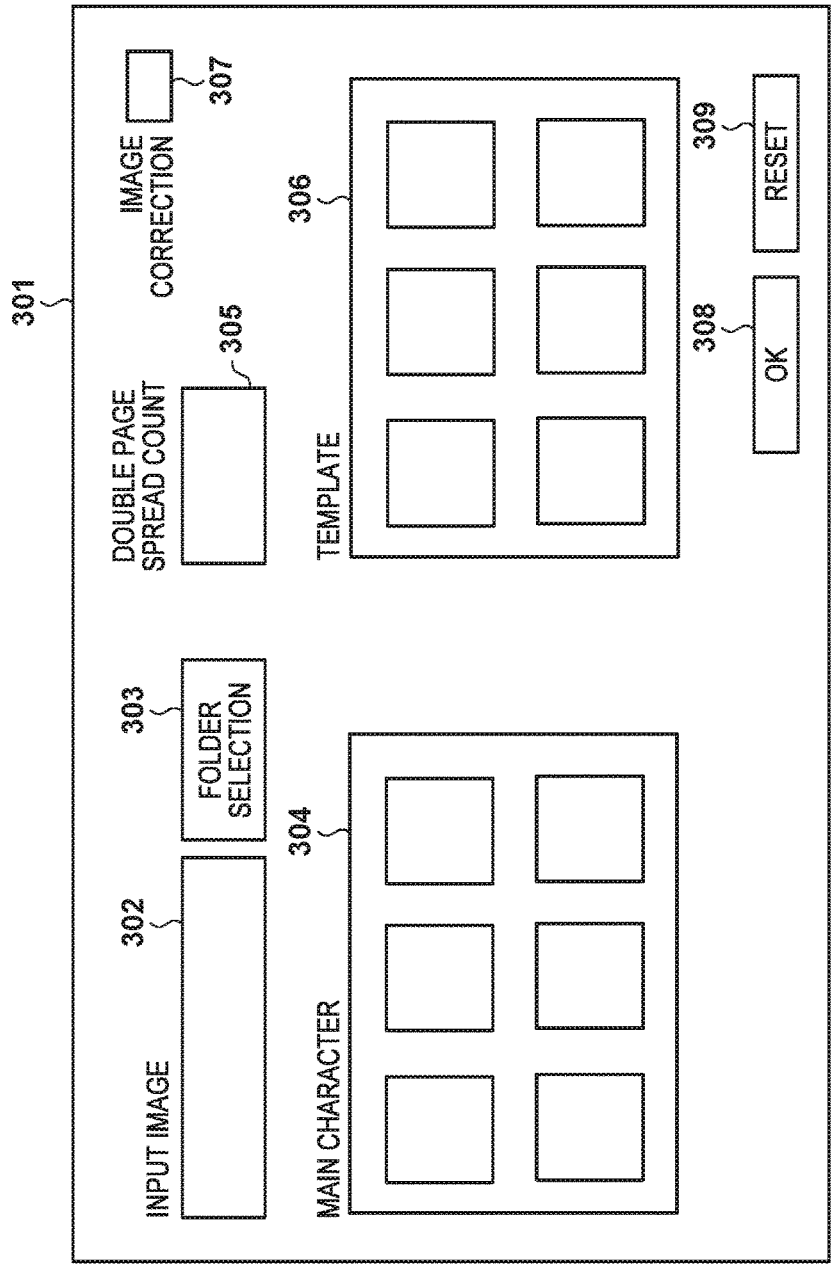

FIG. 5

| IMAGE ID | SHOOTING DATE/TIME | FOCUS | FACE COUNT | PERSONAL ID ||||||  |
|---|---|---|---|---|---|---|---|---|---|---|
| | | | | 1 || 2 || 3 || ... |
| | | | | UPPER LEFT POSITION | LOWER RIGHT POSITION | UPPER LEFT POSITION | LOWER RIGHT POSITION | UPPER LEFT POSITION | LOWER RIGHT POSITION | |
| 1 | 2015/7/1 10h11m12s | ○ | 6 | 40,40 | 65,65 | 90,40 | 115,65 | 10,20 | 25,35 | ... |
| 2 | 2015/7/1 10h12m30s | ○ | 2 | 50,100 | 100,150 | 150,150 | 190,165 | 150,125 | 190,165 | ... |
| 3 | 2015/7/1 10h15m54s | ○ | 0 | — | — | — | — | — | — | ... |
| ... | ... | ... | ... | ... | ... | ... | ... | ... | ... | ... |

F I G. 7

| SCENE | SHOOTING PERIOD (TIME) | | NUMBER OF SHOT IMAGES | | NUMBER OF SHOT PEOPLE | |
|---|---|---|---|---|---|---|
| | AVERAGE | STANDARD DEVIATION | AVERAGE | STANDARD DEVIATION | AVERAGE | STANDARD DEVIATION |
| TRIP | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURE OF MAIN SLOT | IMAGE FEATURE OF SUB-SLOT |
|---|---|---|
| TRIP | LONG SHOT IMAGE INCLUDING PERSON AND SCENERY | CLOSE-UP IMAGE OR IMAGE OF FACE IN PROFILE |
| DAILY LIFE | CLOSE-UP IMAGE OR IMAGE OF FACE IN PROFILE | LONG SHOT IMAGE INCLUDING PERSON AND SCENERY |
| CEREMONY | IMAGE INCLUDING TWO PEOPLE CLOSE TO EACH OTHER | IMAGE OF MANY PEOPLE |

FIG. 8B

| IMAGE ID | SCORE (MAXIMUM OF 50 POINTS) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... |

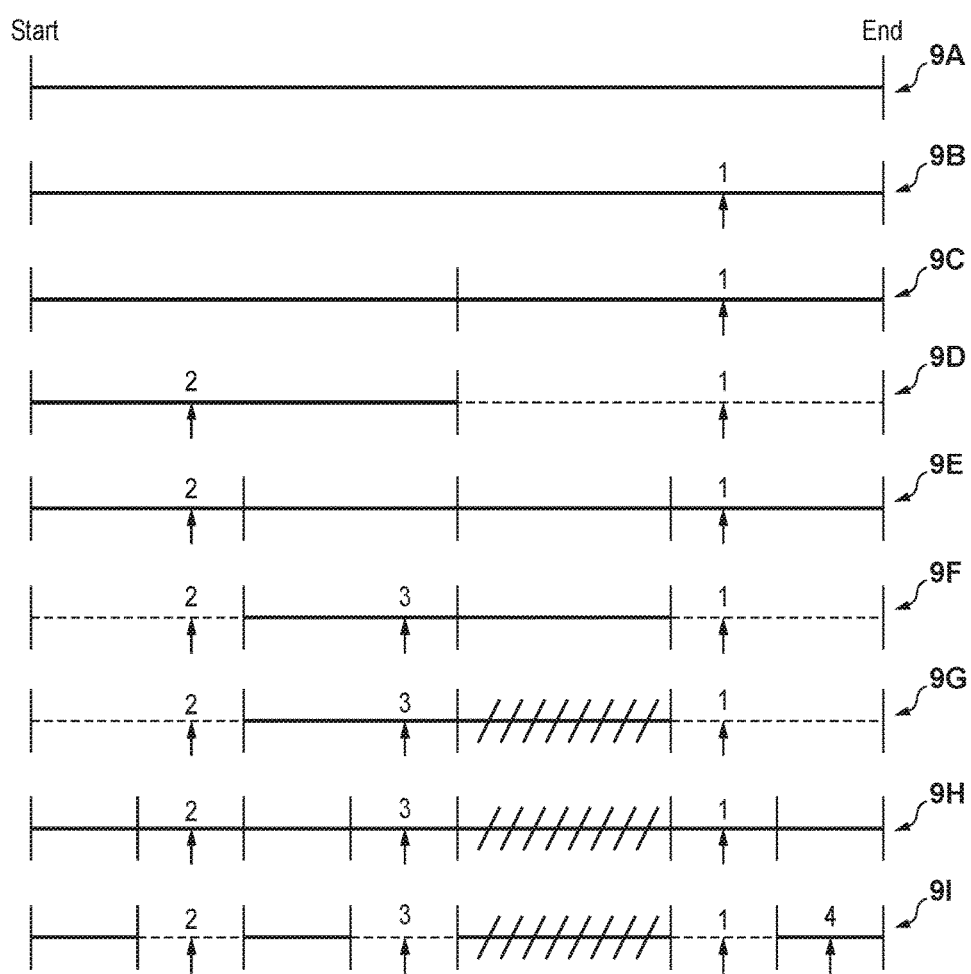

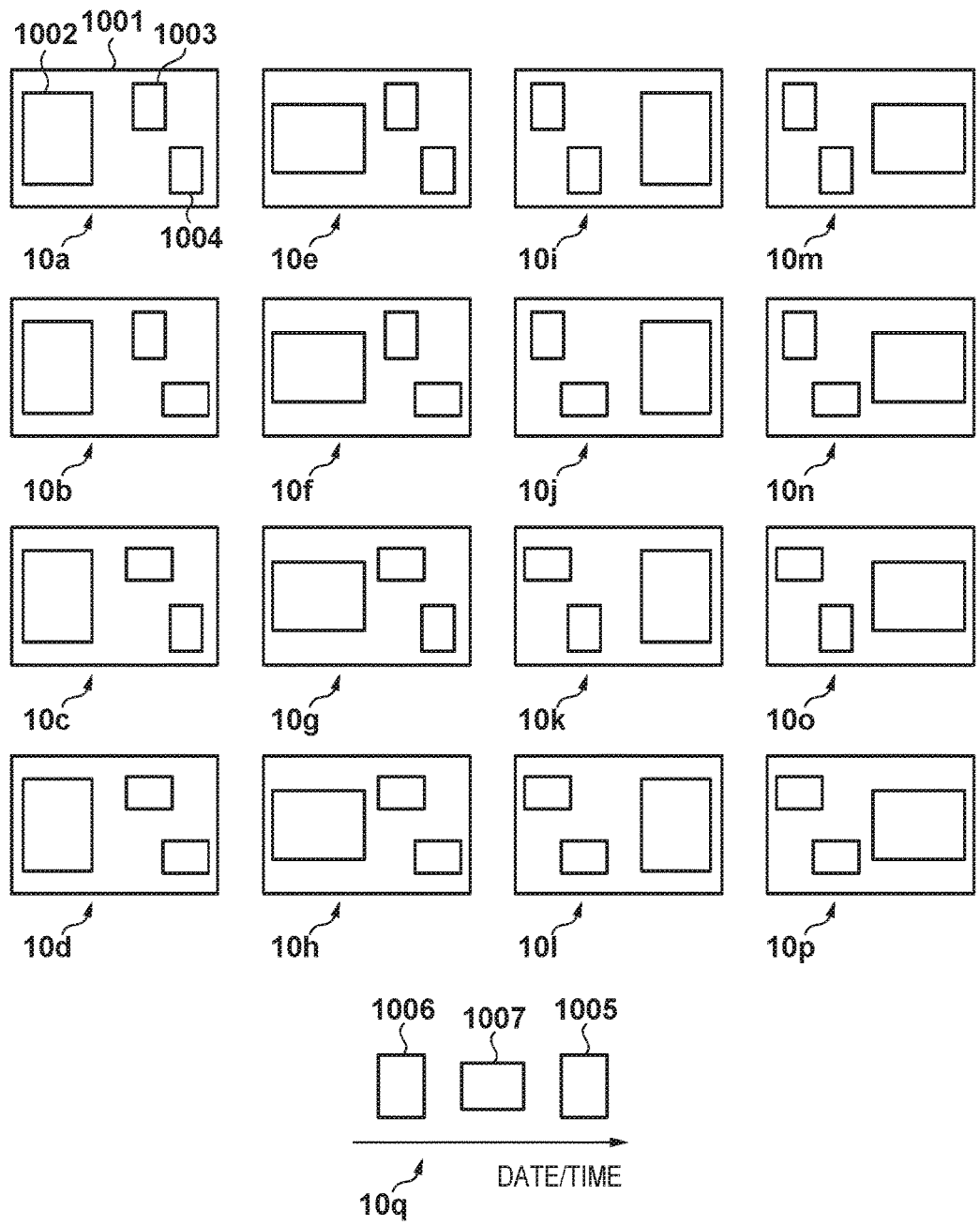

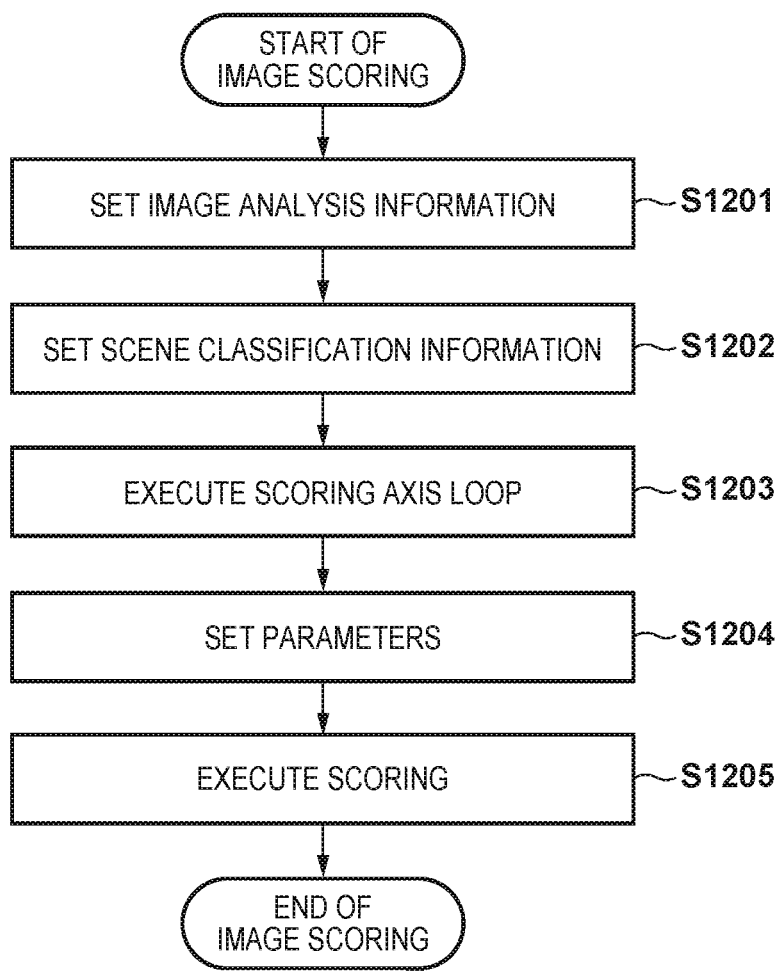
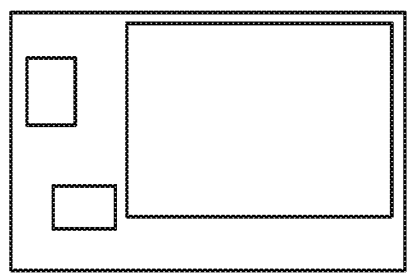

IMAGE PROCESSING APPARATUS, IMAGE PROCESSING METHOD, AND STORAGE MEDIUM STORING A PROGRAM THAT SELECT IMAGES BASED ON EVALUATIONS AND LAY OUT A MAIN IMAGE ON A MAIN SLOT AND A SUB IMAGE ON A SUB SLOT IN A TEMPLATE

CLAIM OF PRIORITY

This application claims the benefit of Japanese Patent Application No. 2015-157513, filed Aug. 7, 2015, and Japanese Patent Application No. 2015-255240, filed Dec. 25, 2015, which are hereby incorporated by reference herein in their entirety.

BACKGROUND OF THE INVENTION

Field of the Invention

The present invention relates to an image processing apparatus for processing image data, an image processing method, and a storage medium storing a program.

Description of the Related Art

In recent years, the number of images shot by an individual has increased along with popularization of a mobile terminal having a camera function. The total amount of image data held by an individual has also increased. It was relatively easy to arrange a small number of shot images in an album when a film camera was the mainstream. However, under the current situation, it has become difficult to arrange a large amount of image data in an album. An album creation service having an automatic layout function of encouraging the effective use of a large amount of image data has begun to be provided.

Automatic layout indicates that some or all of functions associated with album creation are automatically processed. For example, images are automatically selected to be laid out in an album, a template to be used for the album is automatically decided, and images are automatically assigned in the template. The automatic layout function allows the user to quickly create an album, and can also be used as a creation guideline when creating an ideal album.

Especially, with respect to automatic selection of images, it is necessary to select images preferable for the user based on scores obtained by evaluating images provided from the user. As for scoring of images, Japanese Patent Laid-Open No. 2008-084047 describes an image evaluation apparatus for automatically evaluating images selected, based on a given selection criterion, from an image group input by a user.

As described in Japanese Patent Laid-Open No. 2008-084047, if face additional information such as the positional relationship and size of a face is used as an evaluation criterion, images having similar compositions tend to be selected for all pages of an album formed by images selected based on the evaluation criterion. For example, even if images shot in a plurality of shooting scenes, such as a trip, daily life, and ceremony scenes are mixed in an image group input by the user, images are selected based on the same evaluation criterion. As a result, an album in which there are no variations in selected images for the respective shooting scenes is completed. Consequently, an album that is not preferable for the user who desires an album in which images of various characteristics are arranged is unwantedly created.

SUMMARY OF THE INVENTION

An aspect of the present invention is to eliminate the above-mentioned problems with the conventional technology. The present invention provides an image processing apparatus for selecting an image of a layout target based on an evaluation criterion corresponding to the kind of scene of the image, an image processing method, and a storage medium storing a program.

The present invention, in one aspect, provides an image processing method that is executed in an image processing apparatus for laying out an image, the method comprising analyzing a feature amount for each of a plurality of images as layout target candidates, determining, based on the analyzed feature amounts of the plurality of images, a kind of scene into which the plurality of images are classified, performing image evaluation in accordance with an evaluation criterion corresponding to the decided kind of scene, and selecting an image to be laid out from the plurality of images based on the evaluation for each of the plurality of images.

According to the present invention, it is possible to select and to lay out an image having an image feature of a scene based on an evaluation criterion corresponding to the kind of scene of the image.

Further features of the present invention will become apparent from the following description of exemplary embodiments with reference to the attached drawings.

BRIEF DESCRIPTION OF THE DRAWINGS

FIG. 2 is a software block diagram showing an album creation application;

FIG. 3 is a view showing a display screen provided by the album creation application;

FIG. 5 is a table showing image analysis information;

FIG. 7 is a table showing average values and standard deviations for each scene;

FIGS. 8A and 8B are tables showing the concept of a scoring axis;

FIG. 9 is a view for explaining selection of image data;

FIG. 10 is a view showing a template group to be used to lay out image data;

FIG. 12 is a flowchart illustrating scoring processing;

FIG. 13 is a view showing a similar template;

DESCRIPTION OF THE EMBODIMENTS

Figure 1:
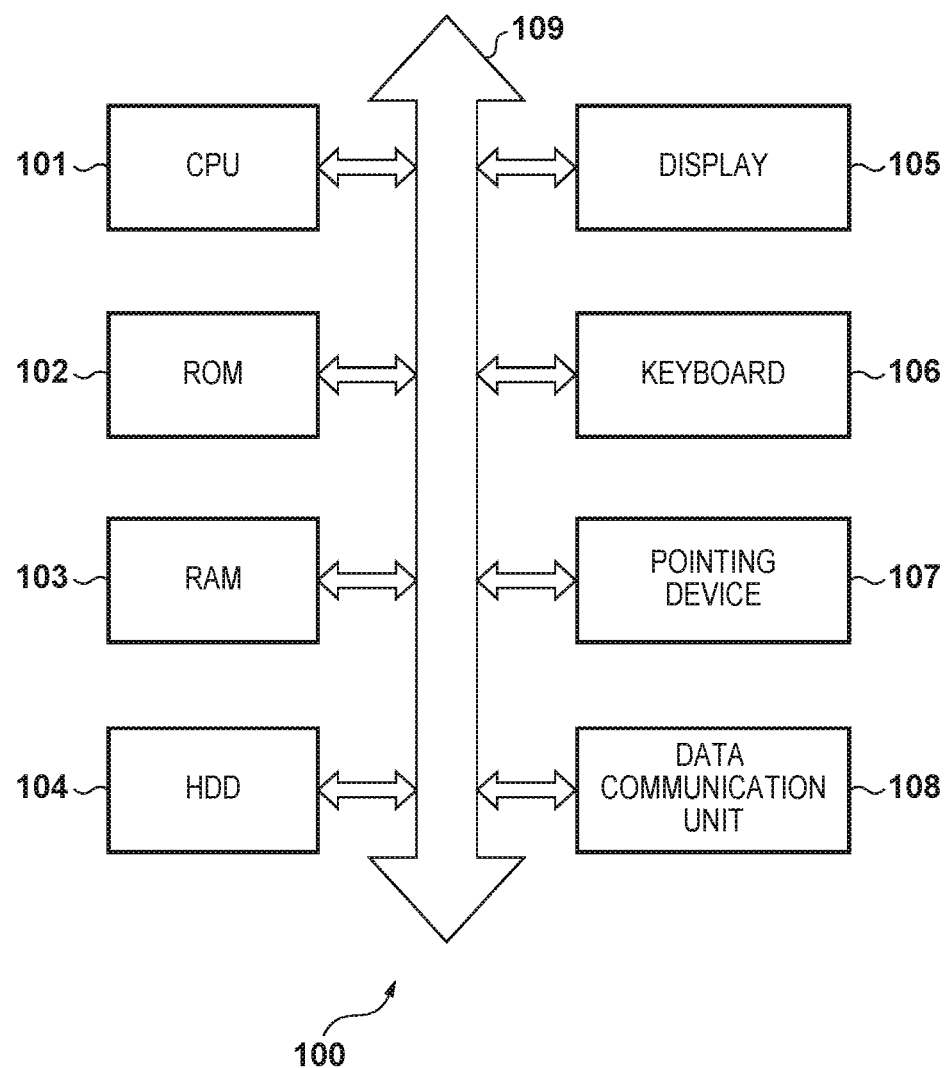
FIG. 1 is a block diagram showing the hardware arrangement of an image processing apparatus.

Preferred embodiments of the present invention will now be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will be omitted.

First Embodiment

This embodiment will describe processing of operating an album creation application on an image processing apparatus, and generating a layout by an automatic layout function.

FIG. 1 is a block diagram showing the hardware arrangement of the image processing apparatus. Note that examples of the image processing apparatus are a personal computer (PC) and a smartphone. In this embodiment, a PC is used. A CPU (Central Processing Unit/Processor) 101 comprehensively controls an image processing apparatus 100, and implements an operation according to this embodiment by, for example, reading out a program stored in a ROM 102 into a RAM 103, and executing it. Referring to FIG. 1, one CPU is included. However, a plurality of CPUs may be included. The ROM 102 is a general-purpose ROM, and stores, for example, a program to be executed by the CPU 101. The RAM 103 is a general-purpose RAM, and is used as, for example, a working memory for temporarily storing various kinds of information at the time of execution of a program by the CPU 101. An HDD (Hard Disk Drive) 104 is a storage medium (storage unit) for storing a database that holds image files and processing results of image analysis, and the like, and templates used by the album creation application.

A display 105 displays a user interface (UI) of this embodiment and the layout result of images to the user. A keyboard 106 and a pointing device 107 accept instruction operations from the user. The display 105 may have a touch sensor function. The keyboard 106, for example, is used by the user to input the double page spread count of an album to be created on the UI displayed on the display 105. The pointing device 107, for example, is used by the user to click a button on the UI displayed on the display 105.

A data communication unit 108 communicates with an external apparatus via a network such as a wired or wireless network. For example, the data communication unit 108 transmits data laid out by the automatic layout function to a printer or a server communicable with the image processing apparatus 100. A data bus 109 communicably connects the respective blocks shown in FIG. 1.

The album creation application according to this embodiment is saved in the HDD 104, and is activated when the user double-clicks, by the pointing device 107, the icon of the application displayed on the display 105, as will be described later.

FIG. 2 is a software block diagram showing the album creation application. FIG. 2 is a software block diagram specifically showing an automatic layout processing module 216 for executing the automatic layout function. An album creation condition designation module 201 outputs, to the automatic layout processing module 216, album creation conditions corresponding to a user's UI operation (to be described later) by the pointing device 107.

An image acquisition module 202 acquires, from the HDD 104, an image data group designated by the album creation condition designation module 201. An image conversion module 203 converts, into image data of a desired pixel count and color information, image data to be used for subsequent processing. In this embodiment, the image conversion module 203 converts image data into analysis image data of a pixel count of four hundred twenty pixels on a short side and sRGB color information. An image analysis module 204 executes each of feature amount acquisition processing, face detection processing, expression recognition processing, and personal recognition processing (to be described later) based on the analysis image data. The image analysis module 204 also acquires data added to the image data acquired from the HDD 104, for example, acquires a shooting date/time from Exif information. An image classification module 205 executes scene division and scene classification (both will be described later) for the image data group using shooting date/time information, the number of shot images, detected face information, and the like. A scene indicates a shooting scene, such as a trip, daily life, or a wedding ceremony. An image scoring module 207 scores each image data so that an image appropriate for the layout has a high score. As will be described later, the image scoring module 207 performs scoring using the information from the image analysis module 204 and the information from the image classification module.

A main character information input module 206 inputs, to the image scoring module 207, the ID (identification information) of a main character instructed by the album creation condition designation module 201. The image scoring module 207 is configured to add a higher score to image data including the main character ID input from the main character information input module 206.

A double page spread assignment module 209 divides an image data group and assigns image data to each double page spread of the album. A double page spread count input module 208 inputs, to the double page spread assignment module 209, the double page spread count of the album designated from the album creation condition designation module 201. The double page spread assignment module 209 divides the image data group in accordance with the input double page spread count, and assigns some data (divided data) of the image data group to each double page spread. Based on the scores added by the image scoring module 207, an image selection module 210 selects, from some data of the image data group assigned to each double page spread by the double page spread assignment module 209, image data as many as the number of slots designated from the album creation condition designation module 201.

An image layout module 212 decides the layout of the image data. A template input module 211 inputs, to the image layout module 212, a plurality of templates corresponding to template information designated from the album creation condition designation module 201. The image layout module 212 selects, from the plurality of templates input from the template input module 211, a template suitable for the image data selected by the image selection module 210, and decides the layout of the image data. A layout information output module 215 outputs layout information for displaying the image data on the display 105 in accordance with the layout of the image data decided by the image layout module 212. The layout information is, for example, bitmap data obtained by laying out, in the selected template, the image data selected by the image selection module 210.

An image correction module 214 executes dodging correction (luminance (brightness) correction), red-eye correction, and contrast correction. An image correction condition input module 213 inputs, to the image correction module 214, an ON/OFF condition of image correction designated from the album creation condition designation module 201.

If the image correction condition is ON, the image correction module 214 corrects the image data. If the image correction condition is OFF, the image correction module 214 does not correct the image data. Note that the image correction module 214 corrects the image data input from the image conversion module 203 in accordance with ON/OFF of correction. The pixel count of the image data input from the image conversion module 203 to the image correction module 214 can be changed in accordance with the size of the layout decided by the image layout module 212.

When the album creation application is installed in the image processing apparatus 100, an activation icon is displayed on the top screen (desktop) of an OS (Operating System) operating on the image processing apparatus 100. When the user double-clicks, by the pointing device 107, the activation icon on the desktop displayed on the display 105, the program of the album creation application saved in the HDD 104 is loaded into the ROM 102. When the CPU 101 reads out the program in the ROM 102 into the RAM 103, and executes it, the album creation application is activated.

FIG. 3 is a view showing an example of a display screen 301 provided by the album creation application. The display screen 301 is displayed on the display 105. The user sets album creation conditions (to be described later) via the display screen 301, and the album creation condition designation module 201 acquires the setting contents from the user.

A path box 302 on the display screen 301 displays the save location (path), in the HDD 104, of the image data group as an album creation target. When the user performs a click operation on a folder selection button 303 using the pointing device 107, a folder, including the image data group as an album creation target, is displayed in a tree structure to be selectable by the user. A folder path including the image data group selected by the user is displayed in the path box 302.

A main character designation icon 304 is an icon used by the user to designate a main character. A face image of a person is displayed as an icon. Icons of a plurality of different face images are arranged and displayed in the main character designation icon 304, and can be selected by the user by clicking using the pointing device 107. A double page spread count box 305 accepts a setting of the double page spread count of the album from the user. The user directly inputs a numerical to the double page spread count box 305 via the keyboard 106, or inputs a numerical to the double page spread count box 305 from a list using the pointing device 107.

A template designation icon 306 displays illustration images for respective styles (pop art style, chic style, and the like) of templates. A plurality of template icons are arranged and displayed in the template designation icon 306, and can be selected by the user by clicking using the pointing device 107. A checkbox 307 accepts a designation of ON/OFF of image correction from the user. If the checkbox 307 is checked, image correction ON is designated. If the checkbox 307 is not checked, image correction OFF is designated.

When the user presses an OK button 308, the album creation condition designation module 201 acquires the contents set on the display screen 301. The album creation condition designation module 201 outputs the acquired setting contents to the automatic layout processing module 216 of the album creation application. At this time, the path input to the path box 302 is transferred to the image acquisition module 202. The personal ID of the main character selected in the main character designation icon 304 is transferred to the main character information input module 206. The double page spread count input to the double page spread count box 305 is transferred to the double page spread count input module 208. The template information selected in the template designation icon 306 is transferred to the template input module 211. The ON/OFF designation of image correction in the image correction checkbox 307 is transferred to the image correction condition input module 213. A reset button 309 on the display screen 301 is a button used to reset the respective pieces of setting information on the display screen 301.

Figure 4A:
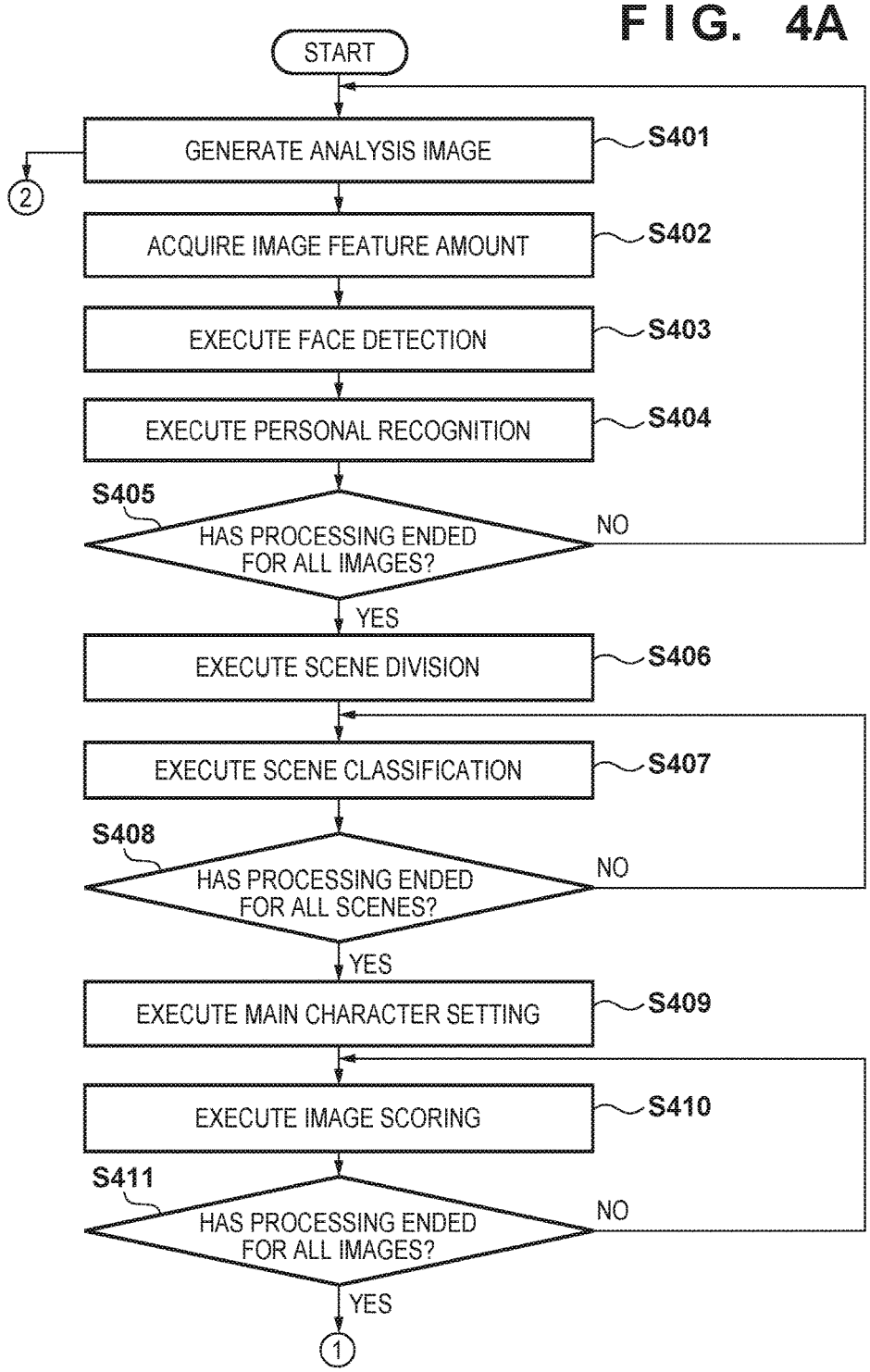
FIGS. 4A and 4B are flowcharts illustrating automatic layout processing.
Figure 4B:
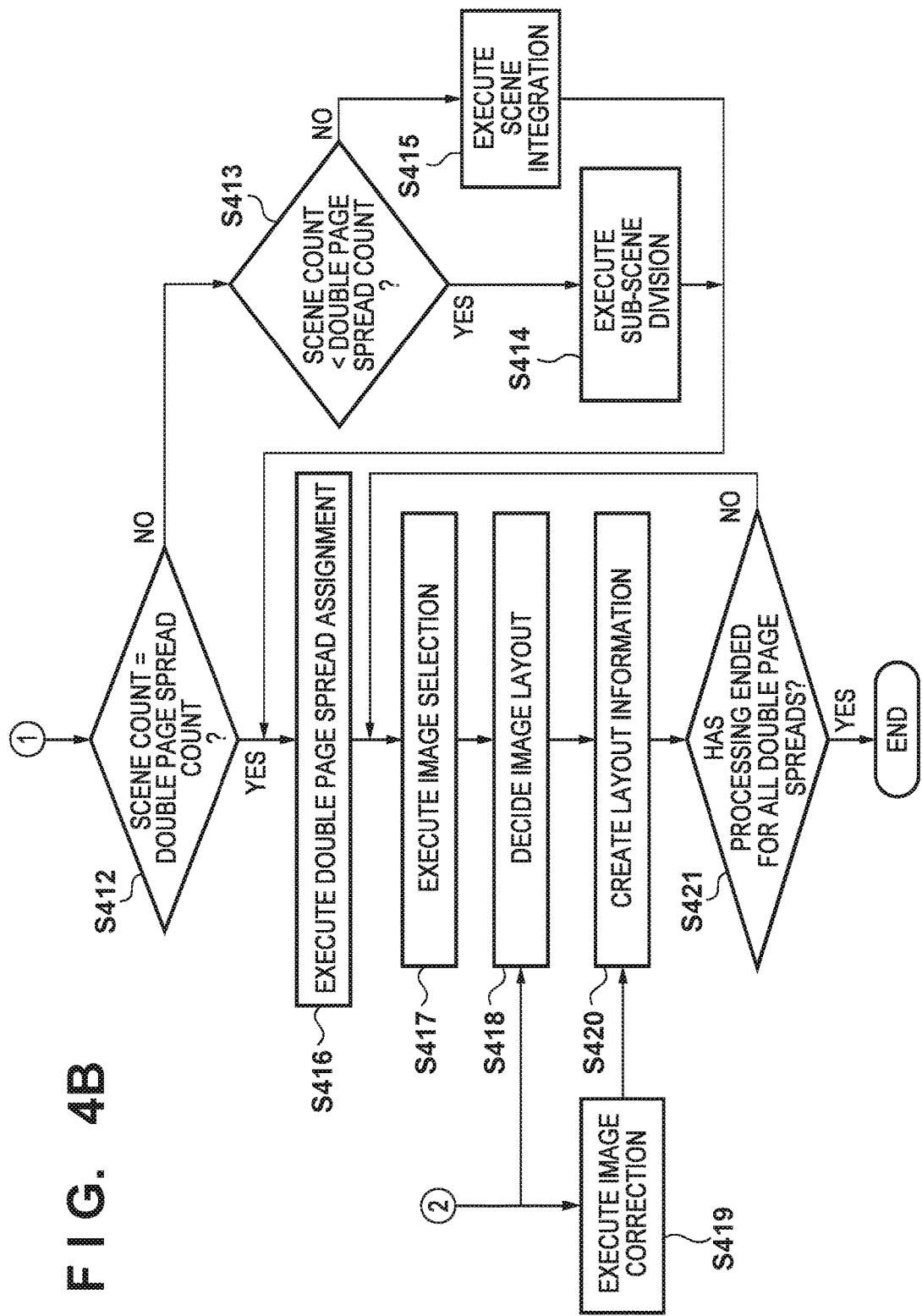

FIGS. 4A and 4B are flowcharts illustrating the processing of the automatic layout processing module 216 of the album creation application. The flowchart shown in FIGS. 4A and 4B is implemented when, for example, the CPU 101 reads out the program stored in the HDD 104 into the ROM 102 or the RAM 103 and executes it. Automatic layout processing will be described with reference to FIGS. 4A and 4B.

In step S401, the image conversion module 203 generates analysis image data. The image conversion module 203 converts each image data of the image data group in the HDD 104, which has been designated by the album creation condition designation module 201, into analysis image data of a desired pixel count and color information. In this embodiment, the image conversion module 203 converts each image data into analysis image data of a pixel count of 420 pixels on a short side and sRGB color information.

In step S402, the image analysis module 204 analyzes and acquires an image feature amount. For example, the image analysis module 204 acquires, from Exif information, a shooting date/time added to each image data acquired from the HDD 104. The image analysis module 204 acquires a feature amount from the analysis image data generated in step S401. An example of the feature amount is focus. A Sobel filter is generally known as an edge detection method. The Sobel filter is used to perform edge detection, and the gradient of an edge is calculated by dividing the luminance difference between the start and end points of the edge by the distance between the start and end points. Based on the result of calculating the average gradient of the edges in the image, an image having a large average gradient can be considered to be in better focus than an image having a small average gradient. If a plurality of different thresholds are set for the gradient, it is possible to output the evaluation value of a focus amount by determining a threshold equal to or less than the gradient. In this embodiment, two different thresholds are preset, and a focus amount is determined in three levels of O, Δ, and x. For example, the gradient of the focus to be adopted for the album is determined as O, the allowable gradient of the focus is determined as Δ, and the unallowable gradient is determined as x, thereby presetting each threshold. For example, each threshold may be provided by the creation source of the album creation application, or the like, or may be settable on the user interface.

In step S403, the image analysis module 204 executes face detection for the analysis image data generated in step S401. A well-known method can be used for the face detection processing. For example, Adaboost for creating a strong discriminator from a plurality of prepared weak discriminators is used. In this embodiment, the strong discriminator created by Adaboost is used to detect a face image of a person (object). The image analysis module 204 extracts a face image, and acquires the upper left coordinate value and lower right coordinate value of the position of the detected face image. By having these two kinds of coordinates, the image analysis module 204 can acquire the position and size of the face image. A strong discriminator may be created by Adaboost by setting, as a detection target, an object such as an animal like a dog or cat, a flower, a food, a building, or a decorative object instead of the face. This allows the image analysis module 204 to detect an object other than the face image.

In step S404, the image analysis module 204 performs personal recognition by comparing the similarities between the face image detected in step S403 and representative face images saved in a face dictionary database for respective personal IDs. The image analysis module 204 sets, as the ID of the detected face image, an ID having the highest similarity that is equal to or greater than a threshold. Note that, if the similarity is less than the threshold, the image analysis module 204 registers the extracted face image as a new face with a new personal ID in the face dictionary database.

The image analysis module 204 discriminates the image analysis information acquired in steps S402 to S404 for each ID for identifying each image, as shown in FIG. 5, and stores it in a storage area such as the RAM 103. For example, as shown in FIG. 5, the shooting date/time information and focus determination result acquired in step S402 and the number of face images and position information detected in step S403 are stored in a table format. Note that the position information of the face image is discriminated and stored for each personal ID acquired in step S404.

In step S405, it is determined whether the processes in steps S401 to S404 have ended for all of the image data of the image data group in the HDD 104, which has been designated by the album creation condition designation module 201. If it is determined that the processes have not ended, the process is repeated from step S401. Otherwise, the process advances to step S406.

Figure 6A:
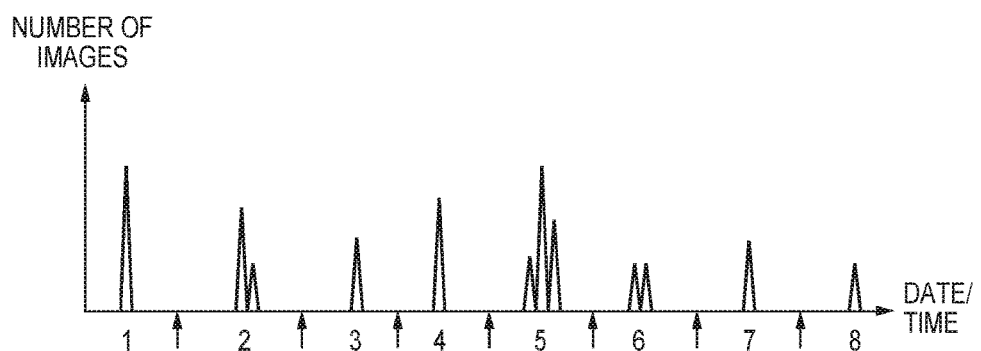
FIGS. 6A to 6C are graphs each showing the result of scene division of an image data group.

In step S406, the image classification module 205 executes scene division. The image classification module 205 divides the image data group into a plurality of scenes based on the time difference between the images, which has been calculated from the shooting date/time information acquired in step S402. In this embodiment, for example, if a date when no shooting is performed exists between the image data, the image data group is divided with reference to that portion. Division may be performed based on another criterion. For example, when performing division even if shooting dates are consecutive, division is performed with reference to a portion where the time difference is sixteen hours or longer. When the time difference is shorter than sixteen hours, if the time difference between the first shooting operation and the last shooting operation on each of the consecutive dates is shorter than four hours, division is performed. When the time difference is equal to or longer than four hours, if the number of shot images on each of the consecutive dates is less than fifty, division is performed. If the number of shot images is equal to or greater than fifty, no division is performed. FIG. 6A shows an example of the result of performing scene division for the image data group by the above scene division method.

In step S407, the image classification module 205 executes scene classification. In this embodiment, the image classification module 205 classifies divided image data obtained by executing scene division into one of a trip, daily life, and ceremony scenes. In this example, before starting the automatic layout processing of FIGS. 4A and 4B, the user collects and designates in advance a plurality of image data determined as a trip, daily life, or a ceremony scene.

Designation performed in advance by the user will now be described.

For example, the album creation condition designation module 201 accepts designation of a plurality of image data determined by the user to be a trip scene on a user interface screen (not shown). The image analysis module 204 acquires feature amounts for the image data. The acquired feature amounts are, for example, a shooting period, the number of shot images, and the number of shot people. The shooting period is the time difference between the first shooting operation and the last shooting operation of the plurality of image data. The number of shot images is the number of the plurality of image data. The number of shot people is the number of shot faces. As a result, for one image data group of the plurality of image data determined by the user as a trip scene, the feature amounts of the shooting period, the number of shot images, and the number of shot people are acquired.

The image analysis module 204 acquires feature amounts of a shooting period, the number of shot images, and the number of shot people for another image data group further designated by the user. Based on the feature amounts acquired from the plurality of image data groups, the image analysis module 204 obtains the average value and standard deviation of the shooting periods, those of the numbers of shot images, and those of the numbers of shot people. FIG. 7 shows the average values and standard deviations corresponding to each of the plurality of kinds of scenes (trip, daily life, and ceremony). The image analysis module 204 stores in advance these values in the storage area such as the ROM 102. Alternatively, these values may be embedded in advance in the program of the album creation application. The average values and standard deviations shown in FIG. 7 are reflected in a selection criterion (image evaluation criterion) based on which an image corresponding to each of the plurality of kinds of scenes is selected. Details will be described later.

The processing of FIGS. 4A and 4B will be explained again. After activating the album creation application, the image classification module 205 calculates the score of each of the feature amounts of the shooting period, the number of shot images, and the number of shot people for each divided data obtained by performing, in step S406, scene division for the image data group designated by the user in the path box 302. The image classification module 205 calculates the score of each of the shooting period, the number of shot images, and the number of shot people of each divided data, and the average score of the calculated scores using the average value and standard deviation for each scene shown in FIG. 7 by:

$$\text{score}=50-|10\times(\text{average value}-\text{feature amount})/\text{standard deviation}| \quad (1)$$

$$\text{average score}=(\text{score of shooting period}+\text{score of number of shot images}+\text{score of number of shot people})/\text{number of feature amount items} \quad (2)$$

As a result of the calculation, an average score for each of the trip, daily life, and ceremony scenes is calculated for the image data of each divided data. The image classification module 205 classifies the image data of each divided data into the scene corresponding to the highest score. The average values and standard deviations corresponding to each of the plurality of kinds of scenes shown in FIG. 7 are reflected in a selection criterion (image evaluation criterion (equation (1))) based on which an image corresponding to each of the plurality of kinds of scenes is selected. Consequently, an image can be selected based on a selection criterion appropriate for the kind of scene.

If there are scenes having equal scores, classification is performed in accordance with the predetermined priority level of each scene. For example, in this embodiment, the priority levels of daily life>ceremony>trip are determined, and the daily life scene has the highest priority level. For example, for image data group 5 shown in FIG. 6A after scene division, a shooting period is thirty-six hours, the number of shot images is three hundred, and the number of shot people is 1.7. The average score of the trip scene calculated by equations (1) and (2) is 45.32, the average score of the daily scene is 18.38, and the average score of the ceremony scene is −29.92. Therefore, image data group 5 is classified into the trip scene. The image classification module 205 assigns a scene ID to the scene, into which the image data group is classified, so as to be identifiable, thereby managing the scene.

In step S408, it is determined whether the scene classification processing in step S407 has ended for all divided data obtained by performing division in step S406. If it is determined that the scene classification processing has not ended, the process is repeated from step S407. Otherwise, the process advances to step S409.

In step S409, the image scoring module 207 executes main character setting. Main character setting is executed, by one of two kinds of setting methods, that is, automatic and manual setting methods, for the image data group designated by the user. The image scoring module 207 can acquire the number of times each personal ID appears in the image data group, the number of times each personal ID appears in each scene, the number of scenes in which each personal ID appears, and the like, from the result of personal recognition executed in step S404 and the result of scene division executed in step S406. The image scoring module 207 automatically sets a main character based on the pieces of information regardless of user designation. In this embodiment, if there are a plurality of scenes, the image scoring module 207 sets, as a main character ID, a personal ID that appears in the plurality of scenes a large number of times. If there is one scene, the image scoring module 207 sets, as a main character ID, a personal ID that appears in the scene a large number of times.

If the user designates the main character designation icon 304, the main character information input module 206 transfers the designated personal ID to the image scoring module 207. If the user designates the personal ID, the image scoring module 207 sets, as a main character ID, the personal ID designated by the user regardless of the automatically set main character ID. This setting will be referred to as manual setting hereafter.

In step S410, the image scoring module 207 executes scoring (evaluates each image). Scoring is to assign (score) a score obtained by evaluating each image data in terms of the following points. The score is referred to when selecting image data of a layout target to be used for the layout (to be described later). FIG. 10 is a view showing a template group to be used to lay out the image data. A template 1001 is one template, a slot 1002 indicates a main slot, and slots 1003 and 1004 indicate sub-slots. The main slot 1002 is a main slot (a frame where an image is laid out) in the template 1001, and is larger in size than the sub-slots 1003 and 1004. For the main slot, image data determined to be the best among image data assigned to a page is selected as a main image. If all of the image data assigned to the page are classified into the same scene, image data selected for the main slot can be that having the image features of the scene most. The image scoring module 207 assigns a main slot score and a sub-slot score to each image data. Note that, in this embodiment, two kinds of criteria of the main slot and the sub-slot are prepared for the template. The number of slot types is not limited. For example, a background slot may be provided in addition to the main slot and the sub-slot. In this case, as well, image data having the image features of the scene most is selected for a slot serving as a main slot and having a large size in the template.

FIG. 8A is a table showing the concept of a scoring axis. FIG. 8A shows a trip, daily life, and ceremony scenes into which the image data are classified by scene classification in step S407. In general, the viewpoints of a photo considered to be preferable for each of the trip, daily life, and ceremony scenes are different. A composition that is most preferable in a trip scene is, for example, a photo including both symbolic scenery at a destination and a person as a main character in the trip. In the ceremony scene, a photo (a photo including two people close to each other) of a composition in which the bride and bridegroom are close together is preferable.

The number of kinds of photos considered to be preferable in each scene is not always limited to one. In the trip scene, in addition to the above-described photo including a person and scenery, a close-up photo of a face, a photo of a face in profile, photos taken with a person who joined the trip and a person who met at the destination, photos of food, a building, and scenery at the destination, and the like, may be considered to be preferable.

As described above, a condition of a preferable photo is different depending on the scene, and one or a plurality of conditions of preferable photos in the scene exist. In this embodiment, to calculate two scores of a main slot score and sub-slot score for each image data, two conditions of preferable photos in each scene are set, as shown in FIG. 8A.

Before starting the automatic layout processing of FIGS. 4A and 4B, the user collects and designates in advance a plurality of image data determined to comply with the features for the main slot and sub-slot of each scene shown in FIG. 8A.

Designation performed in advance by the user will now be described.

For example, the album creation condition designation module 201 accepts a designation of a plurality of image data determined by the user to be suitable for the main slot (or sub-slot) of the trip scene on a user interface screen (not shown). The image analysis module 204 acquires feature amounts of the face count, face position, and face size of each of the designated image data. As a result, the feature amounts of the face count, face position, and face size are acquired for each of the plurality of image data determined by the user to be suitable for the main slot (or sub-slot) of the trip scene. The image analysis module 204 obtains the average value and standard deviation of the face counts, and those of the face positions, and those of the face sizes. The image analysis module 204 obtains the average value and standard deviation as statistic values of each feature amount for each slot type (each of the main slot and sub-slot) of each scene, as described above. The image analysis module 204 stores in advance these values in the storage area, such as the ROM 102. Alternatively, the values may be embedded in the program of the album creation application.

The image scoring module 207 can acquire, from the result of scene classification in step S407, a scene to which each image data as an evaluation target belongs. The image scoring module 207 calculates an average score of the image as an evaluation target using the above average values and standard deviations obtained in advance and corresponding to the scene of the image data of interest and the respective feature amounts of the face count, face position, and face size of the main character ID of the image data of interest by:

$$\text{score} = 50 - |10 \times (\text{average value} - \text{feature amount})/\text{standard deviation}| \quad (3)$$

$$\text{average score} = (\text{score of face count} + \text{score of face position} + \text{score of face size})/\text{feature amount item count} \quad (4)$$

In equation (3) serving as the image evaluation criterion, the average values and standard deviations obtained for the kind of scene corresponding to each image are applied in accordance with the average values and standard deviations corresponding to each of the plurality of kinds of scenes shown in FIG. 7. Consequently, an image can be selected based on the selection criterion (image evaluation criterion) appropriate for the kind of scene.

The image scoring module 207 executes scoring for both the main slot and the sub-slot. Since an image to be used for the album is more preferably in focus, a predetermined score may be added for image data of an image ID having ○ as the feature amount of the focus shown in FIG. 5. FIG. 8B shows an example of the score result of the above scoring, in which each image ID is scored for the main slot and sub-slot.

That is, in this embodiment, conditions suitable for the main slot and the sub-slot are determined for each scene, as shown in FIG. 8A. The user designates, in advance, image data determined to be suitable for the main slot and the sub-slot. The image analysis module 204 acquires the feature amounts of the face count, face position, and face size for each image data designated by the user, and obtains the average value and standard deviation for each feature amount. After activating the album creation application, if the automatic layout processing of FIGS. 4A and 4B starts, a score (similarity) indicating how much each image data (having undergone scene classification) as an automatic layout processing target is close to a user criterion for, for example, the main slot is obtained. For example, referring to FIG. 8B, image ID 1 is assigned with twenty points for the main slot, and image ID 2 is assigned with forty-five points for the main slot. That is, image ID 2 is closer to the user criterion for the main slot.

Figure 11:
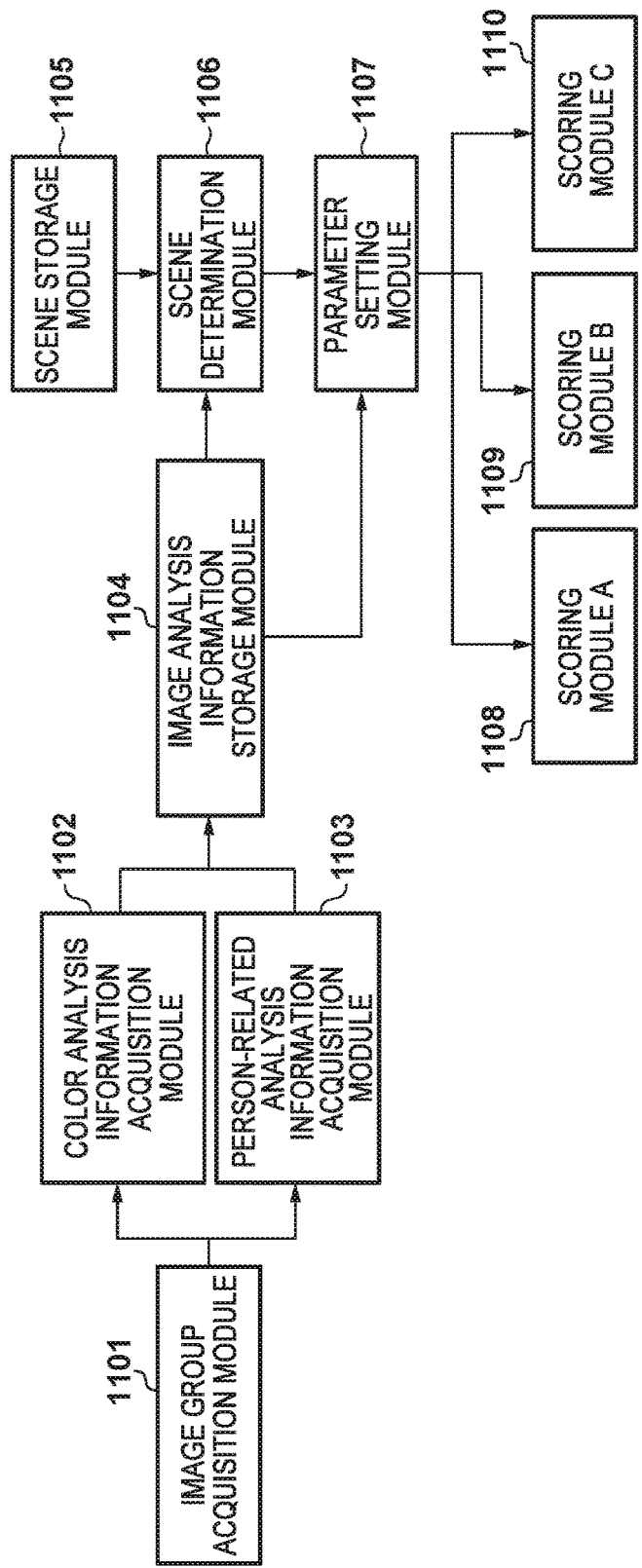
FIG. 11 is a block diagram showing the arrangement of an image scoring module.

The arrangement of the image scoring module 207 will be described. FIG. 11 is a block diagram showing the arrangement of the image scoring module 207. An image group acquisition module 1101 acquires the image data group input from the user. The image group acquisition module 1101 also acquires scene division information obtained in the scene division processing in step S406 at the time of acquisition of the image data group.

A color analysis information acquisition module 1102 acquires the image feature amount acquired in step S402. Furthermore, the color analysis information acquisition module 1102 also acquires analysis information such as shooting date/time information of the image, the tint and edge of the image, and the focus amount. A person-related analysis information acquisition module 1103 acquires the processing results of the face detection processing in step S403 and the personal recognition processing in step S404. Furthermore, the person-related analysis information acquisition module 1103 acquires information of the main character setting processing in step S409.

An image analysis information storage module 1104 comprehensively manages various kinds of image analysis information acquired by the color analysis information acquisition module 1102 and person-related analysis information acquisition module 1103. The image analysis information storage module 1104 also manages a secondary feature that can be calculated/estimated from the color analysis information acquisition module 1102 and person-related analysis information acquisition module 1103. For example, the image analysis information storage module 1104 manages, not only the positions of the respective faces obtained in step S403, but also, the distance between the faces which can be estimated based on the positions. The image analysis information managed by the image analysis information storage module 1104 is not limited to this. For example, not only the pieces of information acquired by the color analysis information acquisition module 1102 and person-related analysis information acquisition module 1103, but also, secondary information may be managed. Furthermore, the image analysis information storage module 1104 may use only one of the color analysis information acquisition module 1102 and person-related analysis information acquisition module 1103.

A scene storage module 1105 stores the respective kinds of shooting scenes, and a scene classification method for determining each shooting scene. In this embodiment, the scene storage module 1105 stores three kinds of scenes, that is, the trip, daily life, and ceremony scenes, and a scene classification method for determining each scene. For example, the scene storage module 1105 stores the pieces of information shown in FIGS. 7 and 8A.

A scene determination module 1106 determines the shooting scene of each image based on the image analysis information managed by the image analysis information storage module 1104. The scene determination module 1106 acquires a processing result corresponding to the scene classification processing in step S407. In this embodiment, each image data is classified into the trip, daily life, or ceremony scene based on the image analysis information. The scene classification processing in the scene determination module 1106 decides the shooting scene of each image data.

A parameter setting module 1107 sets, based on the decided shooting scene, parameters to be used for scoring. In this embodiment, the parameters are, for example, the average value and standard deviation for each of the face count, face position, and face size in a predetermined scene. Parameters decided in advance may be used, or the parameters may be set based on a user's empirical rule or at the time of execution of the system.

Scoring modules 1108, 1109, and 1110 are provided with different parameters from the parameter setting module 1107. Each scoring module scores the image data based on the parameters set by the parameter setting module 1107 and the image analysis information acquired by the image analysis information storage module 1104. In this embodiment, each of the scores acquired by the scoring modules 1108, 1109, and 1110 corresponds to one of the scores for the main slot 1002 and sub-slots 1003 and 1004. The number of scoring modules is not limited. For example, if there are three or more scoring axes required for album creation, three or more scoring modules execute scoring. If fewer than three scoring axes are enough, fewer than three scoring modules execute scoring.

The image scoring module 207 has been explained above. With this processing arrangement, it is possible to execute scoring at a scoring axis corresponding to the shooting scene of each image data by calculating the score of the image data. Since a scoring axis and a parameter decision method are not the same between the shooting scenes, it is possible to acquire image data of a composition or person count optimum for each of the shooting scene or each of the slot types.

FIG. 12 is a flowchart illustrating scoring processing after scene classification in the image scoring module 207.

In step S1201, the image analysis information storage module 1104 acquires the pieces of image analysis information from the color analysis information acquisition module 1102 and person-related analysis information acquisition module 1103, and sets them. In step S1202, the scene determination module 1106 sets the shooting scene of the image classified based on the scene classification method prepared in the scene storage module 1105.

In step S1203, based on the set shooting scene of the image, loop processing for acquiring a plurality of scoring axes in the shooting scene is executed. In this embodiment, the scoring axis is, for example, scoring for the main slot or the sub-slot. In step S1204, the parameter setting module 1107 sets parameters requested at each scoring axis in the set shooting scene of the image. In step S1205, each of the scoring modules 1108, 1109, and 1110 performs scoring in accordance with the set parameters. In this embodiment, scoring is calculated by equations (3) and (4) described above.

The n parameters set in step S1204 are associated with determination thresholds and pieces of determination weight information. In this embodiment, the n parameters are, for example, the above-described face count, face position, and face size for the main slot. In correspondence with the respective parameters at each scoring axis $e(i, j)$, n determination thresholds and n pieces of determination weight information are saved where i corresponds to the ID of the shooting scene of the image set in step S1202 and j corresponds to one of the plurality of scoring axes in the shooting scene.

The determination threshold and determination weight information will be described. The image analysis information acquired in step S1201 is compared with the determination threshold $Th(n, e(i, j))$. If the value of the image analysis information exceeds the determination threshold $Th(n, e(i, j))$, a value $W(n, e(i, j))$ of the determination weight information is reflected in the corresponding parameter (for example, the score of the face count) of equation (4). A value obtained by reflecting the pieces of determination weight information in the respective parameters of equation (4) is set as a final score.

As described above, instead of calculation by equations (3) and (4), the value of the determination weight information of each parameter may be reflected in the final score at each scoring axis. With the above determination threshold and determination weight information, it is possible to flexibly set a parameter (an unused parameter, for example, the face size) having a weight of zero depending on the scoring axis, a parameter to be commonly used for any of the shooting scenes or scoring axes.

In this embodiment, the main slot score and sub-slot score shown in FIG. 8B are assigned to each image data. By scoring at each scoring axis, how much the image data satisfying the user's desired condition is superior or inferior to the other image data can be quantitatively determined. The score may be normalized so as to evaluate superiority and inferiority between the different scoring axes (for example, between the main slot and the sub-slot).

FIGS. 4A and 4B will be referred to again.

In step S411, the image scoring module 207 determines whether image scoring in step S410 has ended for all of the image data of the image data group designated by the user. If it is determined that scoring has not ended, the process is repeated from step S410. Otherwise, the process advances to step S412.

In step S412, the double page spread assignment module 209 determines whether the division count of scene division in step S406 is equal to the double page spread count of the album input from the double page spread count input module 208. If it is determined that these counts are not equal to each other, the process advances to step S413. Otherwise, the process advances to step S416. For example, if the scene division count is eight, as shown in FIG. 6A, and the input count of the double page spread count input module 208 is eight, the process advances to step S416.

In step S413, the double page spread assignment module 209 determines whether the division count of scene division in step S406 is less than the double page spread count input from the double page spread count input module 208. If it is determined that the division count is not less (i.e., is equal to or greater) than the double page spread count, the process advances to step S415. Otherwise, the process advances to step S414. If the scene division count is eight, as shown in FIG. 6A, and the input count of the double page spread count input module 208 is ten, the process advances to step S414.

Figure 6B:
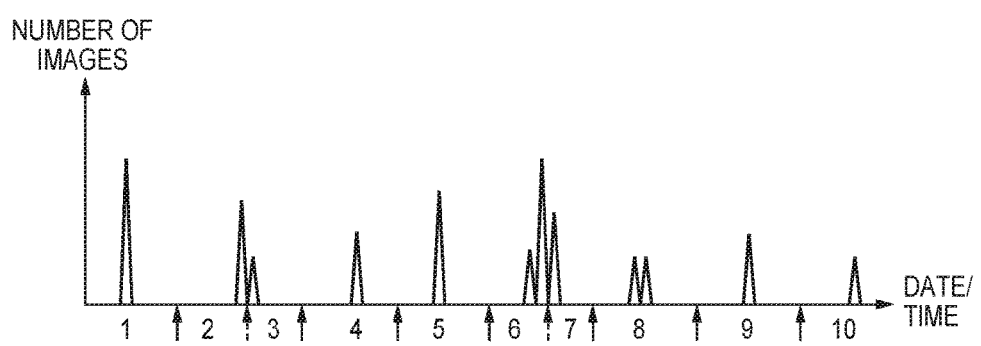

In step S414, the double page spread assignment module 209 executes sub-scene division. Sub-scene division indicates processing of subdividing divided scenes when "scene division count<double page spread count of album" is satisfied. A case in which the designated double page spread count of the album is ten while the scene division count is eight, as shown in FIG. 6A, will be described. FIG. 6B shows a result of performing sub-scene division in the state shown in FIG. 6A. The division number is changed to ten by dividing the scenes at positions indicated by broken arrows.

A division criterion will be described. The divided image groups of FIG. 6A are searched for a divided image group including a large number of images. To increase the division count by two from eight to ten, two image groups, each including a large number of images, are decided. In FIG. 6A, image group 5 and image groups 1 and 2 are decided in descending order of the number of images. Since the numbers of images of image groups 1 and 2 are equal to each other, but image group 2 has a larger time difference between the first image and the last image, image group 2 is decided as a division target, and image groups 5 and 2 are respectively divided.

Division of image group 2 will be described first. Since image group 2 includes two peaks with respect to the number of images, which have different shooting dates, it is divided at the position of the broken arrow shown in FIG. 6B, which corresponds to the position between the two peaks. Division of image group 5 will be described next. Image group 5 includes three peaks with respect to the number of images, which indicate three consecutive dates. There are two positions at which the shooting date changes. Image group 5 is divided at the position of the broken arrow shown in FIG. 6B so that the difference in the number of images after division is small. As described above, the division count is changed from eight to ten. In this example, division is performed at a position at which the shooting date changes. If an image group including a large number of images has one shooting date, it may be divided at a position at which the time difference is largest on the shooting date.

Figure 6C:
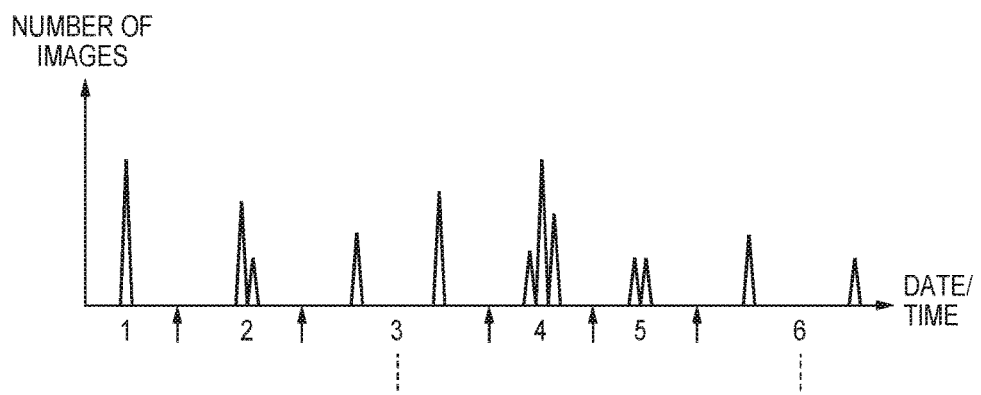

In step S415, the double page spread assignment module 209 executes scene integration. Scene integration indicates processing of integrating the divided scenes when "scene division count>double page spread count of album" is satisfied. FIG. 6C shows a result of executing scene integration in the state shown in FIG. 6A. The division count is changed to six by integrating the scenes at positions indicated by broken lines.

An integration criterion will be described. The divided image groups of FIG. 6A are searched for a divided image group including a small number of images. To decrease the division count by two from eight to six, two image groups, each including a small number of images, are decided. In FIG. 6A, image groups 8, 3, and 7 are decided in ascending order of the number of images. The numbers of images of image groups 3 and 7 are equal to each other. Since, however, image group 8 adjacent to image group 7 is an integration target, image group 3 is decided as an integration target. As a result, each of image groups 8 and 3 undergoes integration.

Integration of image group 3 will be described. By comparing the time differences between image group 3 and preceding and succeeding image groups 2 and 4 of image group 3, it is determined that the time difference from image group 4 is smaller. Therefore, image group 3 is integrated with image group 4, as indicated at the position of the broken line in FIG. 6C. Integration of image group 8 will be described next. Since image group 8 has no succeeding image group, it is integrated with preceding image group 7, as indicated at the position of the broken line in FIG. 6C.

In step S416, the double page spread assignment module 209 executes double page spread assignment. In steps S412 to S415, the scene division count is equal to the designated double page spread count. The double page spread assignment module 209 assigns the first divided image group to the first double page spread in the shooting date order.

In step S417, the image selection module 210 executes image selection. An example of selecting four image data from the divided data of the image data group assigned to a given double page spread will be described below with reference to FIG. 9.

A section shown in 9A between the start and end indicates the time difference (divided shooting period) between the shooting dates/times of the first image data and last image data of the divided data assigned to the double page spread. A method of selecting the first image data will be described with reference to 9B. A template includes the one main slot 1002. Therefore, image data for the main slot is selected as the first image data. The main slot indicates the largest slot in the template. Image data having the image features of the scene most, into which the plurality of image data of the divided data assigned to the double page spread have been classified, is selected for the main slot. As a selection criterion at this time, image data having the highest score for the main slot, which has been assigned in step S410, is selected from a plurality of image data corresponding to the shooting period of the divided data shown in 9B. Image data for sub-slots are selected as the second and subsequent image data.

In this embodiment, image selection is made so as not to concentrate on part of the shooting period of the divided data. A method of subdividing the shooting period of the divided data according to this embodiment will be described below. As shown in 9C, the shooting period of the divided data is divided into two parts. Next, as shown in 9D, the second image data is selected from the shooting period indicated by a solid line during which the first image data has not been selected. Image data having the highest score for the sub-slot is selected from a plurality of image data corresponding to the shooting period indicated by the solid line in 9D.

As shown in 9E, each of the shooting periods of the divided data in 9D is divided into two parts. As shown in 9F, image data having the highest score for the sub-slot is selected as the third image data from a plurality of image data corresponding to the shooting periods indicated by solid lines during which neither the first image data nor the second image data has been selected.

A case in which no image data exists in the shooting period during which image data is to be selected, and thus no image data can be selected, will be described by exemplifying selection of the fourth image data. In an example shown in 9G, when selecting the fourth image data from a hatched shooting period during which no image data has been selected, there is no image data in the hatched shooting period. In this case, as shown in 9H, each of the shooting periods of the divided data is divided into two parts. Next, as shown in 9I, image data having the highest score for the sub-slot is selected as the fourth image data from a plurality of image data corresponding to the shooting periods indicated by solid lines during which none of the first to third image data has been selected.

As described above, by selecting image data based on the scores obtained at different scoring axes such as the main slot and sub-slot, it is possible to add variations to image data selected to be laid out. That is, it is possible to select image data based on different determination criteria, thereby creating an album including the variations of images.

Referring back to FIGS. 4A and 4B, in step S418, the image layout module 212 decides an image layout. An example in which the template input module 211 inputs one of 10*a* to 10*p* of FIG. 10 to a given double page spread in accordance with the designated template information will be described.

In this example, three is designated as the slot count of the input template, as an example. Three selected image data are sorted in the shooting date/time order so as to indicate whether the orientation of each image is the portrait or landscape orientation, as shown in 10*q*. Image data 1005 is used for the main slot and image data 1006 and 1007 are used for the sub-slots. In this embodiment, image data having an earlier shooting date/time is laid out at the upper left position of the template, and image data having a later shooting date/time is laid out at the lower right position. In 10*q*, since the image data 1005 for the main slot has the latest shooting date/time, the templates of 10*m* to 10*p* are candidates. Furthermore, since the older image data 1006 for the sub-slot is a portrait image and the newer image data 1007 is a landscape image, the template of 10*n* is decided as a template optimum for the three selected image data, thereby deciding the layout.

Assume that a template shown in FIG. 13 that matches the template of 10*n* in terms of the slot count and the orientations and positions of the respective slots and in which the size of the main slot is larger than that of the template of 10*n* is found. That is, if a plurality of template candidates exist based on the shooting date order, orientations, and positions of the selected image data, a template is selected based on the difference between the scores of the respective image data in this embodiment. For example, if the score of the image data of the main slot is larger than the average score of the image data of the plurality of sub-slots by an amount exceeding a predetermined threshold, the template, shown in FIG. 13, including the larger main slot, is selected. On the other hand, if the threshold is not exceeded, the template of 10*n* is selected. A case in which another template is found with respect to the main slot has been described above. If another template is found with respect to the sub-slot, a comparison with the average score of the other slots may be performed. In step S418, a specific slot of a specific template is decided to lay out a specific image.

In step S419, the image correction module 214 executes image correction. If image correction ON is input from the image correction condition input module 213, the image correction module 214 executes image correction. As image correction, for example, dodging correction, red-eye correction, and contrast correction are executed. If image correction OFF is input from the image correction condition input module 213, the image correction module 214 executes no image correction. Image correction is executable for image data whose size has been converted into a size of twelve hundred pixels on a short side in the sRGB color space.

In step S420, the layout information output module 215 creates layout information. The image layout module 212 lays out the image data having undergone image correction in step S419 in the respective slots of the template decided in step S418. At this time, the image layout module 212 resizes, in accordance with the size information of each slot, the image data to be laid out, and lays it out. The layout information output module 215 generates bitmap data by laying out the image data in the template.

In step S421, it is determined whether the processes in steps S417 to S420 have ended for all of the double page spreads. If it is determined that the processes have not ended, the process is repeated from step S417. Otherwise, the automatic layout processing of FIGS. 4A and 4B ends.

As described above, according to this embodiment, a scoring criterion changes for each shooting scene into which image data is automatically classified in accordance with the image analysis information. Therefore, image data of a different composition can be selected for each scene. It is possible to automatically assign a high score to a composition preferable for each scene from various viewpoints, and to implement image selection from various viewpoints in album creation. Even if the layout is formed by images of the same scene, it is possible to implement image selection from various viewpoints by using a plurality of scoring axes even in the same scene.

Second Embodiment

In the second embodiment, scores at respective scoring axes obtained at the time of scoring are weighted, and integrated, thereby calculating a plurality of integration scores. The difference from the first embodiment will be described below.

Figure 14:
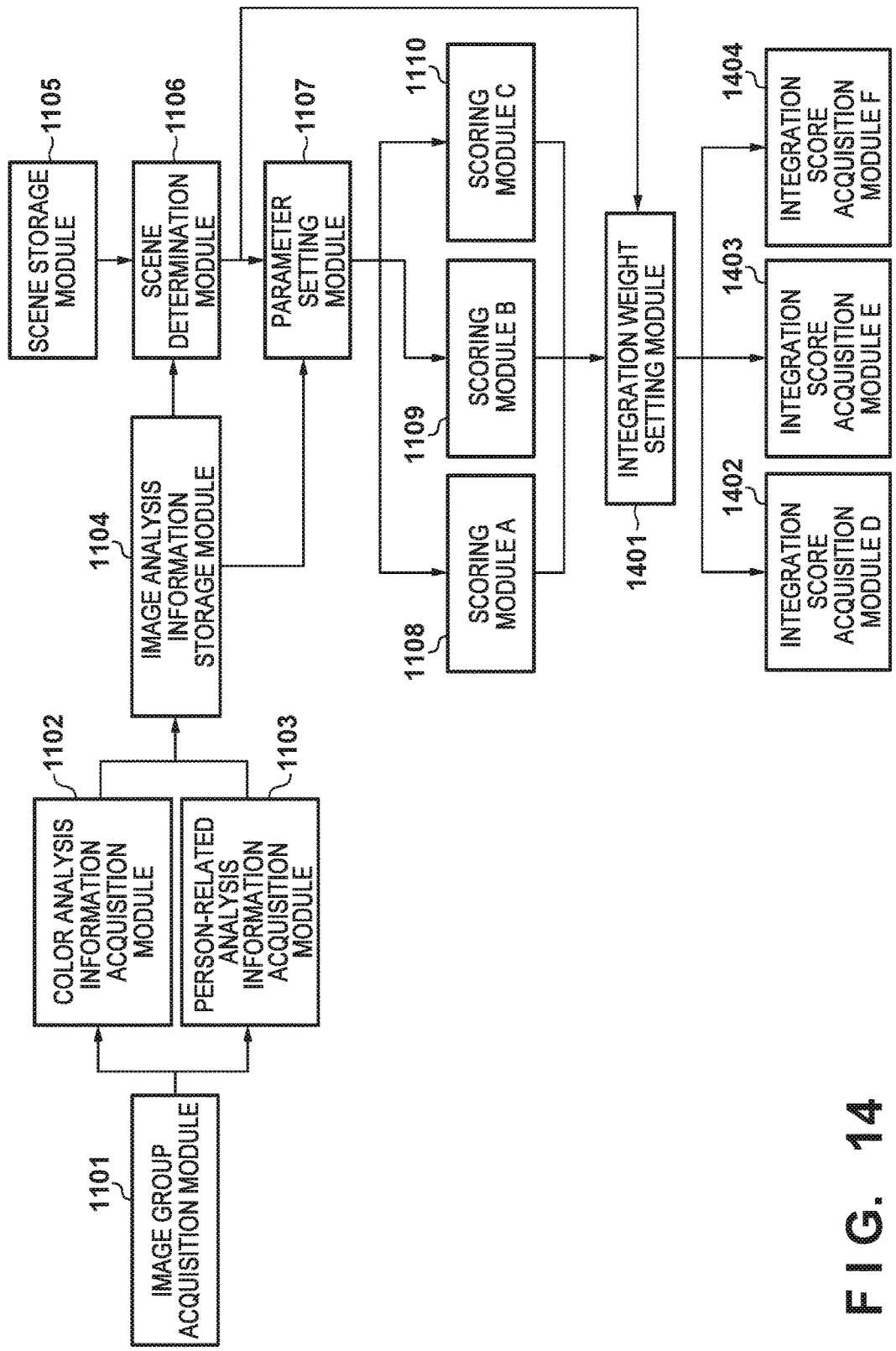
FIG. 14 is a block diagram showing another arrangement of an image scoring module.

FIG. 14 is a block diagram showing the arrangement of an image scoring module 207 for calculating an integration score according to this embodiment. The same reference numerals as those in FIG. 11 of the first embodiment denote the same blocks, and a description thereof will be omitted.

In accordance with a scene classification result obtained by a scene determination module 1106 for each image data, an integration weight setting module 1401 sets weights to be used to integrate the scores of scoring modules 1108, 1109, and 1110.

Integration score acquisition modules 1402, 1403, and 1404 are provided with different weights at the time of integration from the integration weight setting module 1401. Using the respective scores obtained by the scoring modules 1108, 1109, and 1110 and the weights at the time of integration obtained by the integration weight setting module 1401 for the respective scores, each integration score acquisition module acquires an added integration score by:

$$D/E/F = \alpha A + \beta B + \gamma C \quad (5)$$

where D represents the score acquired by the integration score acquisition module 1402, E represents the score acquired by the integration score acquisition module 1403, F represents the score acquired by the integration score acquisition module 1404. Furthermore, $\alpha$, $\beta$, and $\gamma$ represent the weights that are set by the integration weight setting module 1401. Alternatively, setting values on a user interface screen (not shown) may be acquired via an album creation condition designation module 201. In addition, A, B, and C correspond to the scores obtained by the scoring modules 1108, 1109, and 1110, respectively.

In this embodiment, all scores in the scoring module 1108 are calculated based on person-related analysis information obtained by a person-related analysis information acquisition module 1103. For example, parameters used for scoring in the scoring module 1108 are additional information about a face, such as the number of faces, the orientation of each face, and the position of each face of a face detection result with respect to the main slot.

All scores in the scoring module 1109 are calculated based on color analysis information obtained by a color analysis information acquisition module 1102. For example, parameters used for scoring in the scoring module 1109 are additional information obtained from each pixel of an image, such as the luminance component, chromaticness component, and focus information of an image with respect to the main slot.

All scores in the scoring module 1110 are calculated based on all pieces of image analysis information obtained by an image analysis information storage module 1104. For example, parameters used for scoring in the scoring module 1110 are parameters obtained from the parameters used in the scoring modules 1108 and 1109 with respect to the main slot, and include secondary information obtained from image analysis information, such as positional relationship information between persons. In this embodiment, the three integration scoring axes are defined by performing assignment as described above. The present invention, however, is not limited to this.

In this embodiment, each of the scores acquired by the integration score acquisition modules 1402, 1403, and 1404 corresponds to one of scores for a main slot 1002 and sub-slots 1003 and 1004. The numbers of scoring modules and integration score acquisition modules are not limited to three. For example, if three or more scoring axes or integration scoring axes are required for album creation, scoring is executed at three or more scoring axes or integration scoring axes. If fewer than three scoring axes or integration scoring axes are enough, scoring is executed at fewer than three scoring axes or integration scoring axes.

When executing image selection in step S417, the integration weight setting module 1401 can control image data to be set in the main slot and sub-slots. Assume, for example, that the integration score D of the integration score acquisition module 1402 is a score to be considered when selecting image data for the main slot, and a photo including a person is desirably selected for the main slot in the ceremony scene. In this case, the integration weight setting module 1401 sets, in the integration score acquisition module 1402, a condition of equation (5) obtained by setting the weight (corresponding to $\alpha$ in equation (5)) associated with the score of the scoring module 1108 to be greater than $\beta$ and $\gamma$.

Assume that a scenic photo including no person is also desirably selected for the main slot in the trip scene. In this case, the integration weight setting module 1401 sets, in the integration score acquisition module 1402, a condition of equation (5) obtained by setting the weight (corresponding to β in equation (5)) associated with the score of the scoring module 1109 to be greater than α and γ.

In addition, the integration weight setting module 1401 can adjust the ratio of a photo, including a person and a photo including no person, to be selected for the sub-slots by changing the weights associated with the scores of the scoring modules 1108 and 1109 between the shooting scenes. The weight adjustment influences the ratio of a person photo and a non-person photo, which are eventually selected on the layout.

Figure 15:
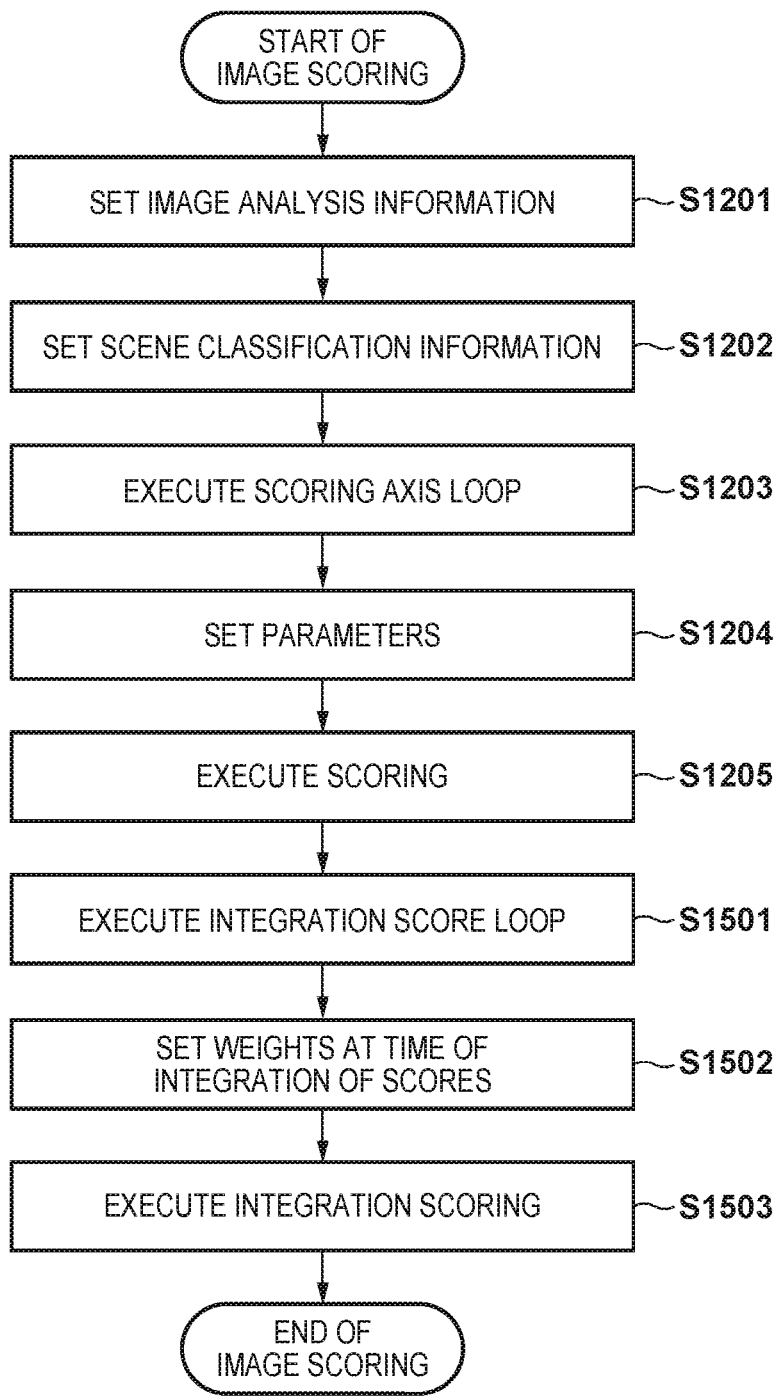
FIG. 15 is a flowchart illustrating another scoring processing.

FIG. 15 is a flowchart illustrating scoring processing according to this embodiment.

In step S1201, the image analysis information storage module 1104 acquires the pieces of image analysis information from the color analysis information acquisition module 1102 and person-related analysis information acquisition module 1103, and sets them. In step S1202, a scene determination module 1106 sets the shooting scene of the image classified based on a scene classification method prepared in a scene storage module 1105.

In step S1203, based on the set shooting scene of the image, loop processing for acquiring a plurality of scoring axes in the shooting scene is executed. In this embodiment, the scoring axis is, for example, scoring based on the person-related analysis information. In step S1204, a parameter setting module 1107 sets parameters requested at each scoring axis in the set shooting scene of the image. In step S1205, each of the scoring modules 1108, 1109, and 1110 performs scoring in accordance with the set parameters. Scoring is calculated by equations (3) and (4) described above.

In step S1501, loop processing for calculating a plurality of integration scores with respect to each scoring axis obtained in step S1205 is executed. In this embodiment, the scoring axis is, for example, scoring for the main slot or sub-slot. In step S1502, at the time of calculation of each integration score, the integration weight setting module 1401 sets weights to be used to integrate the scores obtained in step S1205. In step S1503, the integration score acquisition modules 1402, 1403, and 1404 weight and integrate the scores of the scoring modules 1108, 1109, and 1110 for each image data in accordance with the weights set in step S1502.

According to the second embodiment, in addition to scoring at the plurality of scoring axes (scoring units A to C) corresponding to the scene, integration scores are calculated by weighting and adding the respective scores. Even in the arrangement including one main slot and two sub-slots as in the first embodiment, it is possible to obtain the following effects by using the integration scores to select images in the album layout.

It is possible to select images of different compositions for a plurality of sub-slots.

It is possible to adjust, for each scene, the ratio of the person image and non-person image of image data with respect to a plurality of sub-slots.

The above effects are applicable to not only sub-slots, but also, main slots. If the condition is that a plurality of images are selected for main slots, it is possible to obtain the same effects as those for the sub-slots.

Third Embodiment

In the third embodiment, random numbers are added to scores at each scoring axis obtained at the time of scoring. The difference from the first and second embodiments will be described below.

Figure 16:
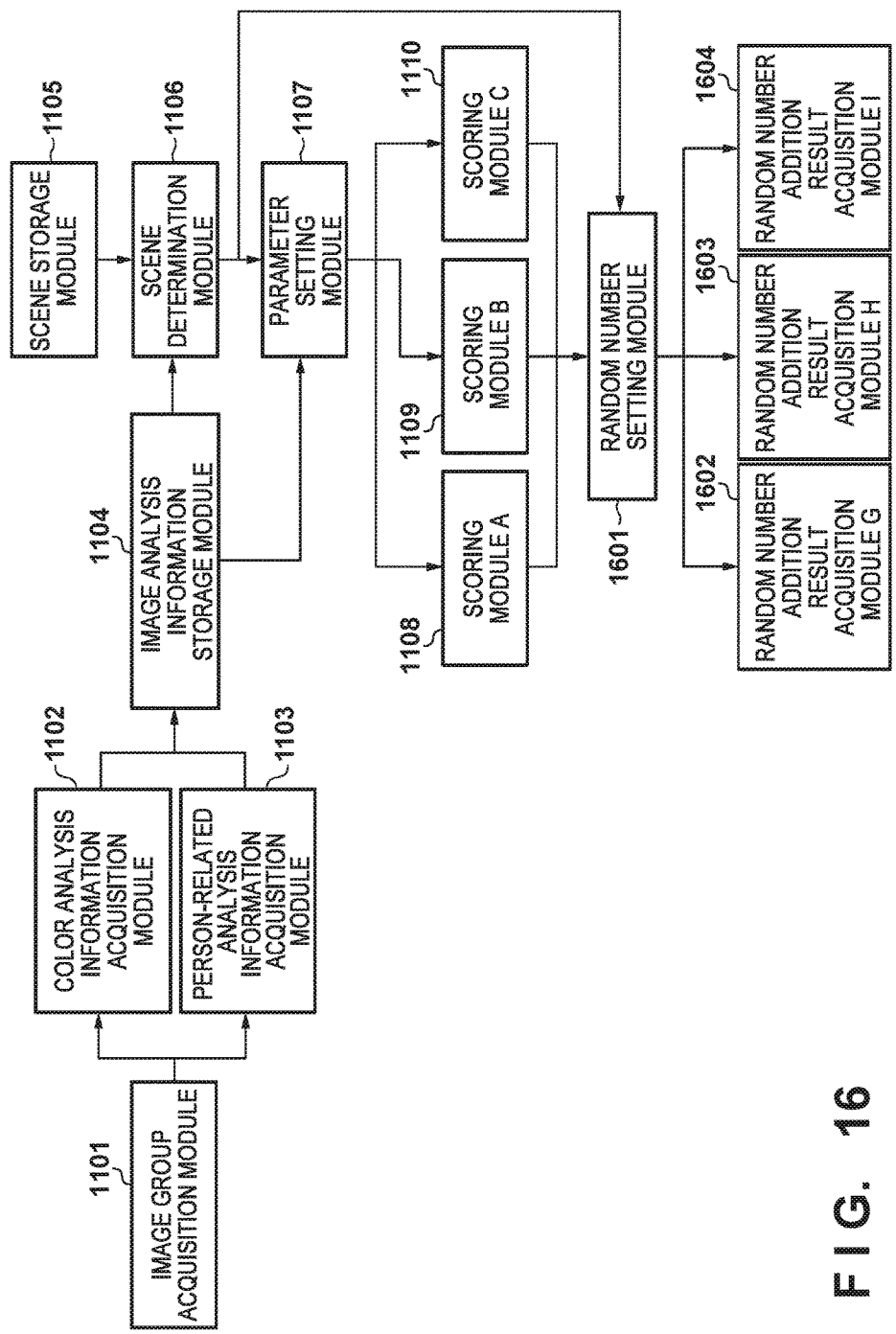
FIG. 16 is a block diagram showing still another arrangement of an image scoring module.

FIG. 16 is a block diagram showing the arrangement of an image scoring module 207 for calculating random numbers to be added. The same reference numerals as those in FIG. 11 of the first embodiment denote the same blocks, and a description thereof will be omitted.

A random number setting module 1601 sets a random number amount to be added to each of the scores of scoring modules 1108, 1109, and 1110 in accordance with a scene classification result obtained by a scene determination module 1106 for each image data.

Random number addition result acquisition modules 1602, 1603, and 1604 are provided with different random numbers to be added from the random number setting module 1601. Note that, in this embodiment, three scores of random number addition results are defined by performing assignment as described above. The present invention, however, is not limited to this. In this embodiment, by performing random number addition as described above, it is possible to add variations to image data of scores determined to be close to each other within a predetermined threshold range in the distribution at the same scoring axis (for example, between sub-slots).

Figure 17:
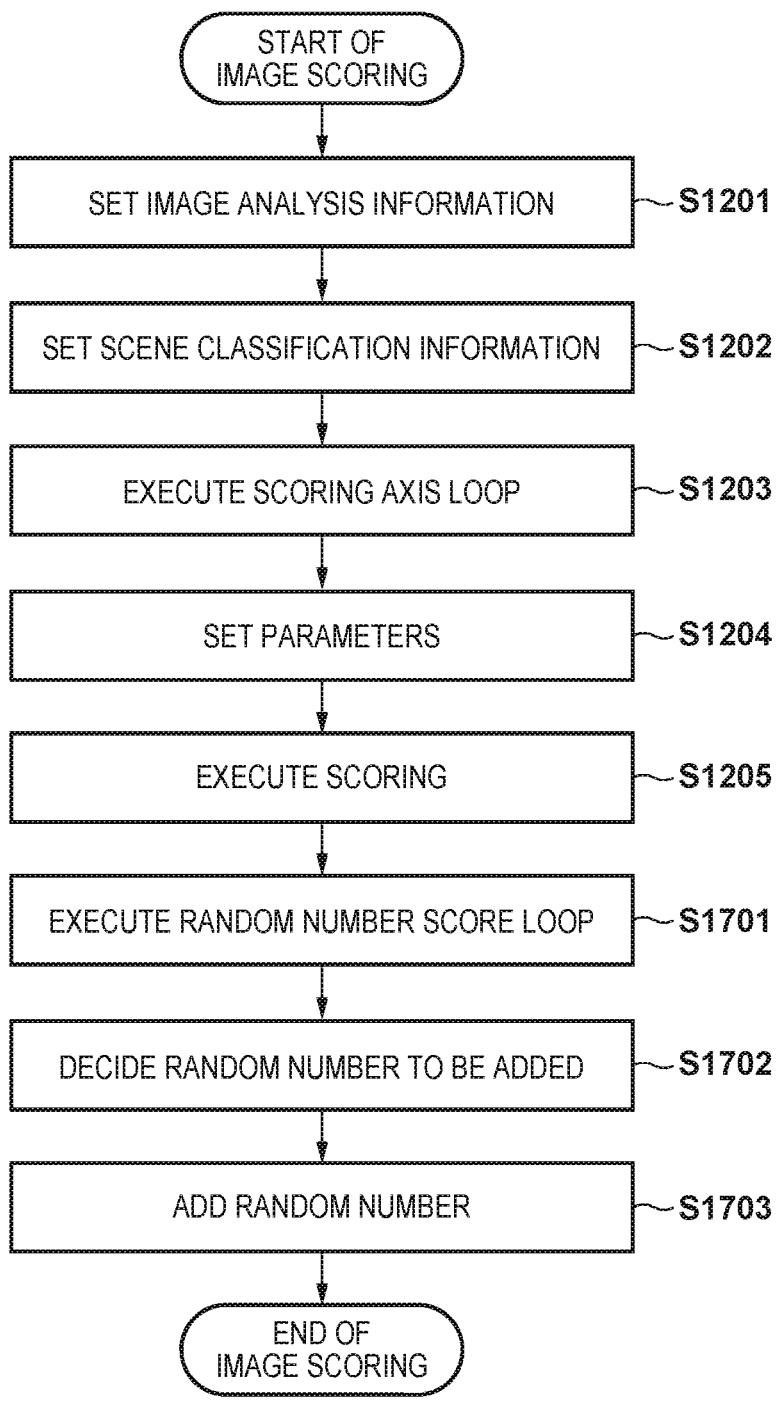
FIG. 17 is a flowchart illustrating still another scoring processing.

FIG. 17 is a flowchart illustrating scoring processing according to this embodiment. The same reference symbols as those in FIG. 12 of the first embodiment denote the same steps, and a description thereof will be omitted.

In step S1701, loop processing for calculating a plurality of random number addition results with respect to each scoring axis obtained in step S1205 is executed. In step S1702, the random number setting module 1601 decides an amount to be added to each score obtained in step S1205. In step S1702, a predetermined threshold is set for each score obtained in step S1205, and setting may be made to add a random number to only the score exceeding the threshold. With this arrangement, the probability that image data, having a score equal to or higher than a predetermined value is selected, can be increased. In step S1703, each of the random number addition result acquisition modules 1602, 1603, and 1604 adds a random number to each score obtained in step S1205 in accordance with the random number adjustment set in step S1702.

According to the third embodiment, in addition to scoring by a plurality of scoring axes in accordance with a scene, random numbers are added for each image data. By using scores added with random numbers for image selection in an album layout, it is possible to add variations to compositions of selected images.

FIG. 16 shows an example in which the random number setting module 1601 according to this embodiment sets a random number for each of the scores of the scoring modules 1108 to 1110 according to the first embodiment. However, the random number setting module 1601 may set a random number for each of the scores of the integration score acquisition modules 1402 to 1404 according to the second embodiment.

Each of the above embodiments has exemplified an example in which the album creation application is assumed. However, the present invention may be applied to image evaluation processing for selecting/displaying an appropriate image from shooting scenes in an image data group.

Although FIG. 1 shows the hardware block diagram by assuming a standalone personal computer or game machine, the present invention is not limited to this. For example, the same arrangement may be implemented on a smart device that can be carried. Although FIG. 1 shows the hardware block diagram by assuming a local environment, the present invention is not limited to this. For example, by using an image saved in a server or uploading an image to a server, the same arrangement as that in each embodiment may be implemented.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing method, for creating an album of a plurality of double page spreads, that is executed, in an image processing apparatus, by a processor executing a program stored in a memory, the method comprising: dividing a plurality of images into a plurality of image groups corresponding to the double page spreads; analyzing a feature amount for each of the images included in each of the plurality of image groups; determining, based on the analyzed feature amount of the images, a kind of scene of an image group among the plurality of image groups, performing a first image evaluation for an image of the image group, in accordance with a first evaluation criterion corresponding to the determined kind of scene among a plurality of first evaluation criteria, and performing a second image evaluation for an image of the image group in accordance with a second evaluation criterion, corresponding to the determined kind of scene among a plurality of second evaluation criteria, different from the first evaluation criteria; automatically selecting a main image included in each of the plurality of image groups, to be laid out on a main slot in a template, based on the first image evaluation for selecting the main image, and automatically selecting a sub image included in each of the plurality of image groups, to be laid out on a sub slot in the template that is smaller than the main slot, based on the second image evaluation performed for selecting the sub image, except the selected main image; and automatically laying out the main image on the main slot in the template for each of the plurality of double page spreads, and automatically laying out the sub image on the sub slot in the template, wherein the kind of scene is determined individually for each of the plurality of image groups, and the first evaluation criterion and the second evaluation criterion are selected individually for each of the plurality of image groups.

2. The method according to claim 1, wherein the first image evaluation is performed based on a similarity between the first evaluation criterion and the analyzed feature amount, and the second image evaluation is performed based on a similarity between the second evaluation criterion and the analyzed feature amount.

3. The method according to claim 2, wherein the feature amount is analyzed for each of a plurality of parameters, and the similarity between the first evaluation criterion and the analyzed feature amount is evaluated for each of the plurality of parameters, and the similarity between the second evaluation criterion and the analyzed feature amount is evaluated for each of the plurality of parameters.

4. The method according to claim 3, further comprising setting a weight for each of scores corresponding to each of the first image evaluation and the second image evaluation performed for each of the plurality of parameters,
wherein the scores are totaled in accordance with the weights set for the respective scores, and each of the main image and the sub image is selected from the plurality of images based on the totaled score.

5. The method according to claim 3, wherein the plurality of parameters include a parameter associated with a person image.

6. The method according to claim 5, wherein the parameter associated with the person image includes at least one of a face count, a face position, and a face size.

7. The method according to claim 3, wherein the plurality of parameters include a parameter associated with image data.

8. The method according to claim 7, wherein the parameter associated with the image data includes at least one of a luminance, a chromaticness, and focus information.

9. The method according to claim 1, further comprising reflecting a random number in each score corresponding to each of the first image evaluation and the second image evaluation,
wherein each of the main image and the sub image is selected based on the scores in which the random numbers have been reflected.

10. The method according to claim 1, wherein an image having a higher score corresponding to the first image evaluation is selected as the main image, and an image having a higher score corresponding to the second image evaluation is selected as the sub image.

11. The method according to claim 1, wherein an image determined to have image features of the scene most, into which the image groups have been classified, among each of the plurality of image groups, is selected as the main image.

12. The method according to claim 1, wherein each of the first evaluation criterion and the second evaluation criterion is a criterion associated with a person image.

13. The method according to claim 1, wherein the main image is selected before the sub image is selected, and then, the sub image is selected based on the second image evaluation, date and time information of the selected main image, and date and time information of the sub image.

14. The method according to claim 1, further comprising deciding a template, based on at least one of an orientation of each of the main image and the sub image, and date and time information of each of the main image and the sub image,
wherein the main image is laid out on a main slot in the decided template, and the sub image is laid out on a sub slot in the decided template.

15. The method according to claim 1, wherein, for each of the images of the image group, both of the first image evaluation and the second image evaluation are performed.

16. An image processing apparatus, for creating an album of a plurality of double page spreads, for automatically laying out an image, the apparatus comprising:
(A) a memory that stores a program; and
(B) a processor that executes the program stored in the memory, wherein the processor:
(a) divides a plurality of images into a plurality of image groups corresponding to the double page spreads;
(b) analyzes a feature amount for each of the images included in each of the plurality of image groups;
(c) determines, based on the analyzed feature amount of the images, a kind of scene of an image group among the plurality of image groups;
(d) performs a first image evaluation for an image of the image group, in accordance with a first image evaluation criterion corresponding to the determined kind of scene among a plurality of first evaluation criteria, and performs a second image evaluation for an image of the image group in accordance with a second evaluation criterion, corresponding to the determined kind of scene among a plurality of second evaluation criteria, different from the first evaluation criteria;
(e) automatically selects a main image included in each of the plurality of image groups, to be automatically laid out on a main slot in a template, based on the first image evaluation for selecting the main image, and automatically selects a sub image included in each of the plurality of image groups, to be automatically laid out on a sub slot in the template that is smaller than the main slot, based on the second image evaluation performed for selecting the sub image, except the selected main image; and
(f) automatically laying out the main image on the main slot in the template for each of the plurality of double page spreads, and automatically laying out the sub image on the sub slot in the template,
wherein the kind of scene is determined individually for each of the plurality of image groups, and the first evaluation criterion and the second evaluation criterion are selected individually for each of the plurality of image groups.

17. The apparatus according to claim 16, wherein the processor performs the first image evaluation based on a similarity between the first evaluation criterion and the feature amount, and performs the second image evaluation based on a similarity between the second evaluation criterion and the feature amount.

18. The apparatus according to claim 17, wherein the feature amount is analyzed for each of a plurality of parameters, and the processor evaluates a similarity between the first evaluation criterion and the analyzed feature amount for each of the plurality of parameters, and evaluates a similarity between the second evaluation criterion and the analyzed feature amount for each of the plurality of parameters.

19. The apparatus according to claim 18, wherein the processor (i) sets a weight for each score corresponding to each of the first image evaluation and the second image evaluation performed for each of the plurality of parameters, (ii) totals the scores in accordance with the weights set for the respective scores, and (iii) selects each of the main image and the sub image from the plurality of images based on the totaled score.

20. The apparatus according to claim 18, wherein the plurality of parameters include a parameter associated with a person image.

21. A non-transitory computer-readable storage medium, for creating an album in a plurality of double page spreads, storing a program for causing a computer to function so as:
to divide a plurality of images into a plurality of image groups corresponding to the double page spreads;
to analyze a feature amount for each of the images included in each of the plurality of image groups;
to determine, based on the analyzed feature amount of the images, a kind of scene of an image group among the plurality of image groups,
to perform a first image evaluation for an image of the image group, in accordance with a first evaluation criterion corresponding to the determined kind of scene among a plurality of first evaluation criteria, and to perform a second image evaluation for an image of the image group in accordance with a second evaluation criterion different from the first evaluation criterion, corresponding to the determined kind of scene among a plurality of second evaluation criterion, different from the first evaluation criteria;
to automatically select a main image included in each of the plurality of image groups, to be laid out on a main slot in a template, based on the first image evaluation for selecting the main image, and to automatically select a sub image included in each of the plurality of image groups, to be laid out on a sub slot in the template that is smaller than the main slot, based on the second image evaluation performed for selecting the sub image, except the selected main image; and
to automatically lay out the main image on the main slot in the template for each of the plurality of double page spreads, and to automatically lay out the sub image on the sub slot in the template,
wherein the kind of scene is determined individually for each of the plurality of image groups, and the first evaluation criterion and the second evaluation criterion are selected individually for each of the plurality of image groups.

* * * * *